(12) United States Patent
Wang et al.

(10) Patent No.: US 11,432,295 B2
(45) Date of Patent: Aug. 30, 2022

(54) COMMUNICATION METHOD AND COMMUNICATIONS APPARATUS

(71) Applicant: HUAWEI TECHNOLOGIES CO., LTD., Guangdong (CN)

(72) Inventors: Ting Wang, Shanghai (CN); Yi Wang, Shanghai (CN); Shengyue Dou, Shanghai (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/912,582

(22) Filed: Jun. 25, 2020

(65) Prior Publication Data

US 2020/0329476 A1   Oct. 15, 2020

Related U.S. Application Data

(63) Continuation of application No. PCT/CN2018/125097, filed on Dec. 28, 2018.

(30) Foreign Application Priority Data

Dec. 29, 2017   (CN) .......................... 201711484436.2

(51) Int. Cl.
*H04W 72/04*  (2009.01)
*H04L 1/16*   (2006.01)

(52) U.S. Cl.
CPC ....... *H04W 72/0493* (2013.01); *H04L 1/1614* (2013.01); *H04W 72/042* (2013.01);
(Continued)

(58) Field of Classification Search
CPC ......... H04W 72/0493; H04W 72/0413; H04W 72/042; H04W 72/0446; H04W 72/0453;
(Continued)

(56) References Cited

U.S. PATENT DOCUMENTS 10,355,840 B2 *  7/2019  Horiuchi ............... H04L 5/0044
10,383,105 B2 *  8/2019  Byun ................... H04W 72/044
(Continued)

FOREIGN PATENT DOCUMENTS

CN   104935419 A   9/2015
CN   106255215 A   12/2016
(Continued)

OTHER PUBLICATIONS

3GPP TSG RAN WG1 Meeting 91,R1-1721360,Summary of RAN1#91 Tdocs on PUCCH resource allocation,OPPO, Reno, USA, Nov. 27-Dec. 1, 2017,total 14 pages.
(Continued)

*Primary Examiner* — Brian T O Connor
(74) *Attorney, Agent, or Firm* — Womble Bond Dickinson (US) LLP

(57) ABSTRACT

A communication method and a communications apparatus are provided. The method includes determining, by an access network device, resource configuration information, where the resource configuration information indicates a resource used to transmit control information, and the resource indication uses a unit of a resource block group RBG. The method further includes sending, by the access network device, the resource configuration information to the terminal. The method includes receiving, by the terminal, the resource configuration information from the access network device. The method further includes transmitting,
(Continued)

by the terminal, control information by using the resource indicated by the resource configuration information.

20 Claims, 10 Drawing Sheets

(52) U.S. Cl.
CPC ... *H04W 72/0413* (2013.01); *H04W 72/0446* (2013.01); *H04W 72/0453* (2013.01)

(58) Field of Classification Search
CPC ......... H04W 72/1284; H04W 72/1289; H04W 72/0486; H04L 1/1614; H04L 5/0094; H04L 5/0053; H04L 5/0055; H04L 5/0057
See application file for complete search history.

(56) References Cited

U.S. PATENT DOCUMENTS

| | | | | |
|---|---|---|---|---|
| 10,750,492 | B2* | 8/2020 | Zhang | H04L 5/0042 |
| 2018/0192409 | A1* | 7/2018 | Yang | H04W 72/044 |
| 2018/0338312 | A1* | 11/2018 | Yoon | H04W 72/08 |
| 2020/0296728 | A1* | 9/2020 | Yoshimura | H04L 5/0044 |

FOREIGN PATENT DOCUMENTS

| | | |
|---|---|---|
| CN | 107231693 A | 10/2017 |
| CN | 107241802 A | 10/2017 |
| CN | 108810996 A | 11/2018 |
| EP | 2557879 A1 | 2/2013 |

OTHER PUBLICATIONS

3GPP TS 36.213 V12.12.0 (Sep. 2017),3rd Generation Partnership Project;Technical Specification Group Radio Access Network,Evolved Universal Terrestrial Radio Access (E-UTRA); Physical layer procedures(Release 12), total 241 pages.
Motorola Mobility, Lenovo, PUCCH resource allocation. 3GPP TSG RAN WG1 #90bis Prague, Czech Republic, Oct. 9-13, 2017, R1-1718702, 6 pages.
Oppo, Resource allocation for PUCCH. 3GPP TSG RAN WG1 Meeting 90bis Prague, CZ, Oct. 9-13, 2017, R1-1718047, 7 pages.
CATT, On PUCCH resource allocation. 3GPP TSG RAN WG1 Meeting #90bis, Prague, Czechia, Oct. 9-13, 2017, R1-1717832, 4 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/125097, filed on Dec. 28, 2018, which claims priority to Chinese Patent Application No. 201711484436.2, filed on Dec. 29, 2017. The disclosures of the aforementioned applications are hereby incorporated by reference in their entireties.

TECHNICAL FIELD

This application relates to the field of information technologies, and in particular, to a communication method and a communications apparatus.

BACKGROUND

In a long term evolution (LTE) system, a terminal may send uplink control information (UCI) to a base station through a physical uplink control channel (PUCCH). The UCI may include at least one piece of information of: scheduling request information (SRI), channel state information (CSI), acknowledgement (ACK)/negative acknowledgement (NACK) feedback information, and the like. The UCI sent by the terminal has a plurality of forms, and may include different feedback content and/or different quantities of feedback bits. Therefore, a plurality of different PUCCH formats are defined in the LTE system.

In the existing LTE system, resource blocks (RBs) in a PUCCH resource allocated by the base station to the terminal are contiguous. There may be no entire block including contiguous resources for allocation in a future communications system. Therefore, this allocation method is not applicable to the future communications system such as a new radio (NR) system. In this case, a resource configuration method is urgently required to meet a resource configuration requirement of a system such as the NR system.

SUMMARY

This application provides a communication method and a communications apparatus, to provide a resource configuration method.

According to a first aspect, an embodiment of this application provides a communication method. The method includes:

determining, by an access network device, resource configuration information, and then sending the resource configuration information to the terminal, where the resource configuration information indicates a resource used to transmit control information, and the resource indication uses a unit of an RBG According to the method, a resource in the unit of an RBG is configured, and one RBG includes one or more RBs. Therefore, the access network device may flexibly configure a quantity of resources and a location of the resource for the terminal, to meet resource configuration requirements of different systems.

According to a second aspect, an embodiment of this application provides a communication method, including:

receiving, by a terminal, resource configuration information from an access network device, where the resource configuration information indicates a resource used to transmit control information, and the resource indication uses a unit of a resource block group RBG; and transmitting, by the terminal, the control information by using the resource indicated by the resource configuration information.

According to the method, a resource in the unit of an RBG is configured, and one RBG includes one or more RBs. Therefore, the access network device may flexibly configure a quantity of resources and a location of the resource for the terminal, to meet resource configuration requirements of different systems.

In one embodiment, the resource configuration information includes one or more of the following:

a frequency domain resource identifier, where the frequency domain resource identifier is an identifier of a frequency domain resource in which the resource indicated by the resource configuration information is located;

an RBG bitmap, where the RBG bitmap is used to indicate a location, in a frequency domain resource, of an RBG included in the resource indicated by the resource configuration information;

RBG capacity information, where the RBG capacity information indicates a quantity of RBs included in one RBG;

a format of the control information corresponding to the resource indicated by the resource configuration information; or a payload type of the resource indicated by the resource configuration information, where the payload type of the resource indicated by the resource configuration information is classified based on a payload size of the control information corresponding to the resource indicated by the resource configuration information.

According to the method, the frequency domain resource in which the resource is located may be determined by using the frequency domain resource identifier, the quantity of RBs included in the RBG in the resource is determined by using the RB capacity information, the location, in the frequency domain resource, of the RBG included in the resource is determined by using the RBG bitmap, a type of the control information and/or a quantity of bits of the control information are/is determined by using the format of the control information corresponding to the resource, the payload size of the control information is determined by using the payload type of the resource, and the like, to flexibly indicate the resource.

In one embodiment, the resource configuration information includes the RBG bitmap. Herein, L bits in the RBG bitmap correspond to one RBG, and L is an integer greater than or equal to 1. In the RBG bitmap, a value of L bits corresponding to an RBG in the resource indicated by the resource configuration information is a first value, and a value of L bits corresponding to an RBG other than the RBG in the resource indicated by the resource configuration information is a second value.

The location, in the frequency domain resource, of the RBG included in the resource may be accurately indicated by using the RBG bitmap, thereby improving system efficiency.

In one embodiment, the quantity of RBs included in the RBG is preset; or the quantity of RBs included in the RBG is determined based on a correspondence between the quantity of RBs and one or more of the format of the control information corresponding to the resource, the payload type of the resource, the payload size of the control information corresponding to the resource, or bandwidth of the frequency domain resource corresponding to the frequency domain resource identifier.

According to the method, the quantity of RBs included in the RBG may be flexibly indicated, thereby improving system efficiency.

In one embodiment, the resource configuration information includes one or more of the following:

a frequency domain resource identifier, where the frequency domain resource identifier is an identifier of a frequency domain resource in which the resource indicated by the resource configuration information is located; a quantity of RBs included in the resource indicated by the resource configuration information; or a pattern identifier, where a pattern indicated by the pattern identifier is a pattern of the resource indicated by the resource configuration information.

According to the method, the frequency domain resource identifier may be flexibly indicated, thereby improving system efficiency.

In one embodiment, when the resource configuration information includes the pattern identifier, the quantity of RBs included in the resource indicated by the resource configuration information is a quantity of RBs corresponding to the pattern identifier.

In one embodiment, when the resource configuration information includes the quantity of RBs included in the resource indicated by the resource configuration information, the pattern of the resource indicated by the resource configuration information is a pattern corresponding to the quantity of RBs included in the resource indicated by the resource configuration information.

In one embodiment, the quantity of RBs included in the resource indicated by the resource configuration information corresponds to at least one pattern; there is no same pattern identifier in pattern identifiers of patterns corresponding to different quantities of RBs, and each pattern is in a unique correspondence with a pattern identifier; or there is a same pattern identifier in pattern identifiers of patterns corresponding to different quantities of RBs, and each pattern is in a correspondence with a pattern identifier and a quantity of RBs.

In one embodiment, the quantity of RBs included in the resource indicated by the resource configuration information is determined based on one or more of the following:

a payload size of the control information corresponding to the resource indicated by the resource configuration information; a payload type of the control information corresponding to the resource indicated by the resource configuration information, where the PUCCH payload type is classified based on a payload size of uplink control information in a PUCCH resource; or a PUCCH format.

In one embodiment, the pattern of the resource indicated by the resource configuration information is determined based on one or more of the following:

the payload size of the control information corresponding to the resource indicated by the resource configuration information; the payload type of the control information corresponding to the resource indicated by the resource configuration information; or a format of the control information corresponding to the resource indicated by the resource configuration information.

According to the method, the pattern of the resource may be flexibly indicated, thereby improving system efficiency.

In one embodiment, the resource configuration information includes one or more of the following:

a resource allocation type; a resource allocation type parameter corresponding to the resource allocation type; a quantity of RBs included in the resource indicated by the resource configuration information; or a pattern identifier, where a pattern indicated by the pattern identifier is a pattern of the resource indicated by the resource configuration information.

In one embodiment, the resource allocation type includes one or a combination of the following types:

a first type, using an RBG bitmap to indicate a location, in a frequency domain resource, of an RBG included in the resource indicated by the resource configuration information; a second type, indicating a start RB of the resource indicated by the resource configuration information and a quantity of RBs included in the resource indicated by the resource configuration information; a third type, indicating the quantity of RBs included in the resource indicated by the resource configuration information and/or a pattern of a PUCCH resource indicated by the resource configuration information; a fourth type: a resource allocation type 0; a fifth type: a resource allocation type 1; and a sixth type: a resource allocation type 2.

In one embodiment, when the resource configuration information does not include the resource allocation type, the resource allocation type is a predefined resource allocation type, or the resource allocation type is the same as a resource allocation type of data scheduling in data sent to the terminal.

According to a third aspect, an embodiment of this application provides a communications apparatus, and the communications apparatus may perform any one of the foregoing methods.

In one embodiment, the apparatus includes one or more processors and a communications unit. The one or more processors are configured to support the apparatus in performing a corresponding function of the access network device in the foregoing method, for example, generating resource configuration information. The communications unit is configured to support the apparatus in communicating with another device, to implement a receiving function and/or a sending function. For example, the communications unit sends the resource configuration information.

In one embodiment, the apparatus may further include one or more memories. The memory is configured to be coupled to a processor. The memory stores a program instruction and/or data necessary for the access network device. The one or more memories may be integrated with the processor, or may be separate from the processor. This is not limited in this application.

The apparatus may be a base station, a gNB, a TRP, or the like. The communications unit may be a transceiver or a transceiver circuit. In one embodiment, the transceiver may alternatively be an input/output circuit or an interface.

The apparatus may alternatively be a communications chip. The communications unit may be an input/output circuit or interface of the communications chip.

In one embodiment, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the access network device in any one of the first aspect or the possible implementations of the first aspect.

In one embodiment, the apparatus includes one or more processors and a communications unit. The one or more processors are configured to support the apparatus in performing a corresponding function of the terminal in the foregoing method, for example, determining the resource by using the resource configuration information. The communications unit is configured to support the apparatus in communicating with another device, to implement a receiving function and/or a sending function. For example, the communications unit transmits control information by using the resource.

In one embodiment, the apparatus may further include one or more memories. The memory is configured to be coupled to a processor. The memory stores a program instruction and/or data necessary for the apparatus. The one or more memories may be integrated with the processor, or may be separate from the processor. This is not limited in this application.

The apparatus may be an intelligent terminal, a wearable device, or the like. The communications unit may be a transceiver or a transceiver circuit. In one embodiment, the transceiver may alternatively be an input/output circuit or interface.

The apparatus may alternatively be a communications chip. The communications unit may be an input/output circuit or interface of the communications chip.

In one embodiment, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the terminal in any one of the second aspect or the possible implementations of the second aspect.

According to a fourth aspect, a system is provided, where the system includes the foregoing terminal and access network device.

According to a fifth aspect, a computer readable storage medium is provided and is configured to store a computer program. The computer program includes an instruction used to perform the method in any one of the first aspect or the possible implementations of the first aspect.

According to a sixth aspect, a computer readable storage medium is provided and is configured to store a computer program. The computer program includes an instruction used to perform the method in any one of the second aspect or the possible implementations of the second aspect.

According to a seventh aspect, a computer program product is provided. The computer program product includes computer program code. When the computer program code runs on a computer, the computer is enabled to perform the method in any one of the first aspect or the possible implementations of the first aspect.

According to an eighth aspect, a computer program product is provided. The computer program product includes computer program code. When the computer program code runs on a computer, the computer is enabled to perform the method in any one of the second aspect and the possible implementations of the second aspect.

According to a ninth aspect, an embodiment of this application provides a communication method. The method includes:
determining, by an access network device, a first resource and a second resource for a terminal; and
sending, by the access network device, resource configuration information and resource offset information to the terminal, where the resource configuration information is used to indicate the first resource, and the resource offset information is used to indicate a time domain offset and/or a frequency domain offset between the first resource and the second resource.

According to the method, the access network device indicates the first resource by using the resource configuration information, and indicates the second resource by using the resource offset information. The resource offset information is the time domain offset and/or the frequency domain offset between the first resource and the second resource. Therefore, overheads required for indicating the second resource can be reduced, thereby improving resource utilization.

According to a tenth aspect, an embodiment of this application provides a communication method. The method includes:
receiving, by a terminal, resource configuration information and resource offset information from an access network device, where the resource configuration information is used to indicate a first resource, and the resource offset information is used to indicate a time domain offset and/or a frequency domain offset between the first resource and a second resource; and determining, by the terminal, the first resource and the second resource based on the resource configuration information and the resource offset information.

According to the method, the access network device indicates the first resource by using the resource configuration information, and indicates the second resource by using the resource offset information. The resource offset information is the time domain offset and/or the frequency domain offset between the first resource and the second resource. Therefore, overheads required for indicating the second resource can be reduced, thereby improving resource utilization.

In one embodiment, the resource offset information indicates a quantity of symbols between a first symbol of the first resource and a second symbol of the second resource.

The first symbol is a start symbol of the first resource or an end symbol of the first resource, and the second symbol is a start symbol of the second resource or an end symbol of the second resource.

In one embodiment, the resource offset information indicates a quantity of RBs between a first resource block RB of the first resource and a second RB of the second resource.

The first RB is a start RB of the first resource or an end RB of the first resource, and the second RB is a start RB of the second resource or an end RB of the second resource.

In one embodiment, the resource offset information indicates a quantity of overlapped time domain symbols and/or a quantity of overlapped frequency domain RBs between the first resource and the second resource.

According to an eleventh aspect, an embodiment of this application provides a communications apparatus, and the communications apparatus may perform any one of the foregoing methods.

In one embodiment, the apparatus includes one or more processors and a communications unit. The one or more processors are configured to support the apparatus in performing a corresponding function of the access network device in the foregoing method, for example, generating resource configuration information. The communications unit is configured to support the apparatus in communicating with another device, to implement a receiving function and/or a sending function. For example, the communications unit sends the resource configuration information.

In one embodiment, the apparatus may further include one or more memories. The memory is configured to be coupled to a processor. The memory stores a program instruction and/or data necessary for the access network device. The one or more memories may be integrated with the processor, or may be separate from the processor. This is not limited in this application.

The apparatus may be a base station, a gNB, a TRP, or the like. The communications unit may be a transceiver or a transceiver circuit. In one embodiment, the transceiver may alternatively be an input/output circuit or interface.

The apparatus may alternatively be a communications chip. The communications unit may be an input/output circuit or interface of the communications chip.

In one embodiment, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the access network device in any one of the ninth aspect or the possible implementations of the ninth aspect.

In one embodiment, the apparatus includes one or more processors and a communications unit. The one or more processors are configured to support the apparatus in performing a corresponding function of the terminal in the foregoing method, for example, determining the resource by using the resource configuration information. The communications unit is configured to support the apparatus in communicating with another device, to implement a receiving function and/or a sending function. For example, the communications unit transmits control information by using the resource.

In one embodiment, the apparatus may further include one or more memories. The memory is configured to be coupled to a processor. The memory stores a program instruction and/or data necessary for the apparatus. The one or more memories may be integrated with the processor, or may be separate from the processor. This is not limited in this application.

The apparatus may be an intelligent terminal, a wearable device, or the like. The communications unit may be a transceiver or a transceiver circuit. In one embodiment, the transceiver may alternatively be an input/output circuit or interface.

The apparatus may alternatively be a communications chip. The communications unit may be an input/output circuit or interface of the communications chip.

In one embodiment, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the terminal in any one of the tenth aspect or the possible implementations of the tenth aspect.

According to a twelfth aspect, a system is provided, and the system includes the foregoing terminal and access network device.

According to a thirteenth aspect, a computer readable storage medium is provided, and is configured to store a computer program. The computer program includes an instruction used to perform the method in any one of the ninth aspect or the possible implementations of the ninth aspect.

According to a fourteenth aspect, a computer readable storage medium is provided, and is configured to store a computer program. The computer program includes an instruction used to perform the method in any one of the tenth aspect or the possible implementations of the tenth aspect.

According to a fifteenth aspect, a computer program product is provided. The computer program product includes computer program code. When the computer program code runs on a computer, the computer is enabled to perform the method in any one of the ninth aspect or the possible implementations of the ninth aspect.

According to a sixteenth aspect, a computer program product is provided. The computer program product includes computer program code. When the computer program code runs on a computer, the computer is enabled to perform the method in any one of the tenth aspect and the possible implementations of the tenth aspect.

DESCRIPTION OF EMBODIMENTS

The following further describes in detail this application with reference to accompanying drawings.

The embodiments of this application may be applied to various mobile communications systems, for example, a new radio (NR) system, a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), an evolved long term evolution (eLTE) system, a future communications system, and another communications system. Specifically, this is not limited herein.

Figure 1:
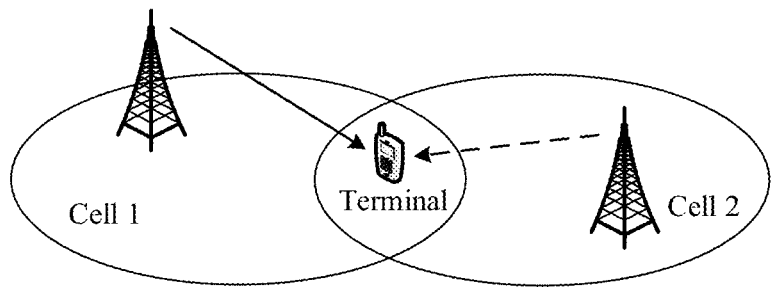
FIG. 1 is a schematic diagram of a coordinated multipoint transmission/reception scenario applicable to this application.

The embodiments of this application are applicable to a single-cell transmission scenario, a coordinated multipoint transmission/reception (CoMP) scenario, or another scenario. FIG. 1 is a schematic diagram of a coordinated multipoint transmission/reception scenario applicable to this application. In FIG. 1, a cell 1 and a cell 2 may jointly send downlink data to a terminal, or may jointly receive uplink data sent by the terminal, thereby effectively reducing interference to the terminal on a cell edge, increasing a system capacity, and improving a user data rate and coverage of a cell boundary. The embodiments of this application are applicable to another scenario. Details are not described herein.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be alternatively used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, information, a signal, a message, or a channel may be interchangeably used sometimes. It should be noted that expressed meanings are consistent when differences are not emphasized. In addition, "of", "corresponding (corresponding or relevant)", and "corresponding (corresponding)" may be interchangeably used sometimes. It should be noted that expressed meanings are consistent when differences are not emphasized.

In the embodiments of this application, sometimes a subscript in, for example, W1 may be written in an incorrect form such as W1. Expressed meanings are consistent when differences are not emphasized.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that as the network architecture evolves and a new service scenario emerges, the technical solutions provided in the embodiments of this application are also applicable to similar technical problems.

The embodiments of this application may be applied to both a time division duplex (TDD) scenario and a frequency division duplex (FDD) scenario.

The embodiments of this application may be applied to both a conventional typical network and a future network in which a terminal such as user equipment UE is used as a center (UE-centric). A non-cell network architecture is introduced into the UE-centric network. To be specific, a large quantity of small cells are deployed in a specific area to form a hyper cell. Each small cell is a transmission point (TP) or a TRP of the hyper cell, and is connected to a centralized controller. When the UE moves in the hyper cell, a network side device (including an access network device) selects a new sub-cluster for the UE in real time to serve the UE, to avoid a real cell handover, thereby implementing service continuity of the UE. The network side device includes a wireless access network device. A terminal in this application is a device that has a wireless transceiver function or a chip that can be disposed in the device, or may be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal in the embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal and the chip that may be disposed in the foregoing terminal are collectively referred to as the terminal.

The access network device is a device that has a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (WIFI) system, a wireless relay node, a wireless backhaul node, a transmission point (TRP; or TP), and the like, or may be a gNB or a transmission point (TRP or TP) in a 5G system such as an NR system, a antenna panel or a group of antenna panels (including a plurality of antenna panels) of a gNB in the 5G system, or may be a network node forming a gNB or a transmission point, such as a baseband unit (BBU) or a distributed unit (DU).

In some deployment, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control ( ) layer, and a physical (PHY) layer. Information at the RRC layer may finally become information at the PHY layer, or may be converted from information at the PHY layer. Therefore, in this architecture, it may be considered that higher layer signaling such as RRC layer signaling or PHCP layer signaling is sent by the DU, or is sent by the DU and the RU. It may be understood that the access network device (including the access network device) may be a CU node, a DU node, or a device including a CU node and a DU node. In addition, the CU may be classified into an access network device in an access network RAN, or the CU may be classified into an access network device in a core network CN. This is not limited herein.

In the embodiments of this application, different access network devices may be access network devices that have different identifiers, or may be access network devices that have a same identifier and that are deployed in different geographical locations. Before the access network device is deployed, the access network device does not know whether the access network device is used in the scenario to which the embodiments of this application are applied. Therefore, the access network device or a baseband chip should support a method provided in the embodiments of this application before being deployed. It may be understood that the different identifiers of the access network devices may include an access network device identifier, a cell identifier, or another identifier.

In the embodiments of this application, an NR network scenario in a wireless communications network is used to describe some scenarios. It should be noted that the solutions in the embodiments of this application may be further applied to another wireless communications network, and a corresponding name may also be replaced with a name of a corresponding function in the another wireless communications network.

Figure 2:
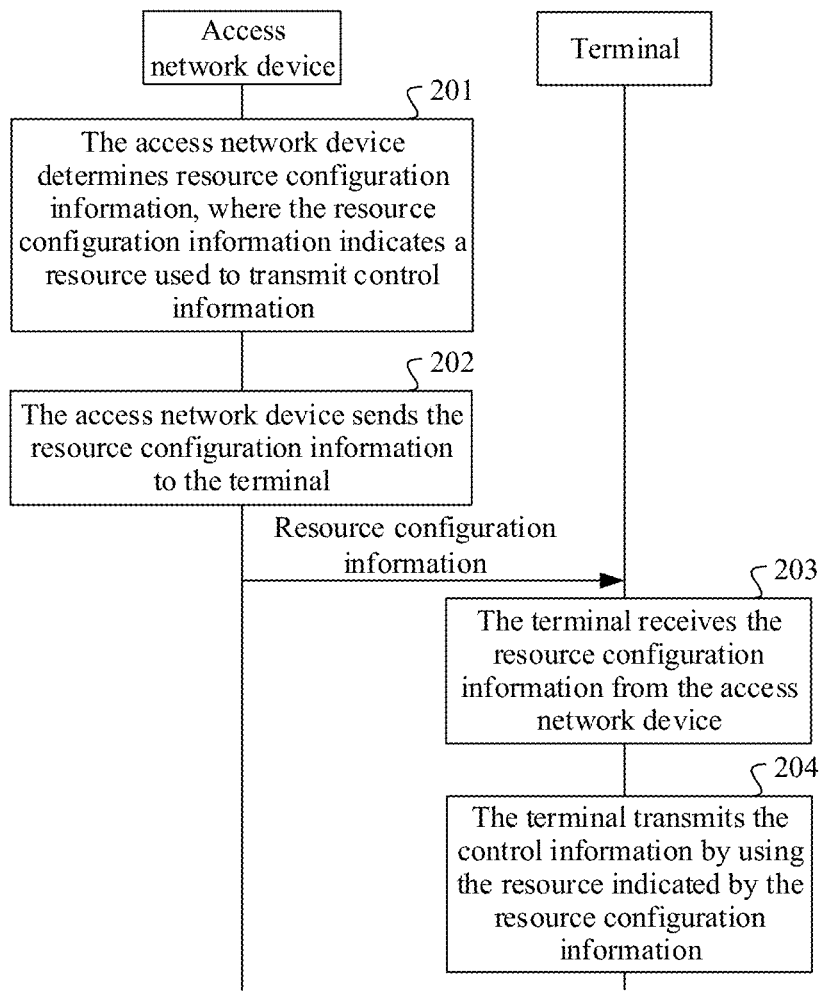
FIG. 2 is a schematic flowchart of a communication method according to an embodiment of this application.

FIG. 2 is a schematic flowchart of a communication method according to an embodiment of this application.

The method includes the following operations:

Operation 201: An access network device determines resource configuration information, where the resource configuration information indicates a resource used to transmit control information.

Specifically, the resource configuration information may be used to indicate one or more resources used to transmit control information. In this embodiment of this application, the resource may be referred to as one of the one or more resources, or may be referred to as each of the one or more resources.

The resource configuration information may be one piece of signaling, or may be a plurality of pieces of signaling.

The resource indicated by the resource configuration information may be in a unit of a resource block group (RBG), and the RBG includes at least one RB.

Operation 202: The access network device sends the resource configuration information to the terminal.

Operation 203: The terminal receives the resource configuration information from the access network device.

Operation 204: The terminal transmits the control information by using the resource indicated by the resource configuration information.

In operation 201, the resource that is indicated by the resource configuration information and that is used to transmit the control information may be a PUCCH resource, a physical downlink control channel (physical downlink control channel, PDCCH) resource, or the like. This is not limited in this embodiment of this application.

For example, when the resource is a PUCCH resource, the terminal may send information such as UCI by using the PUCCH resource.

In this embodiment of this application, the resource configuration information may indicate one or more pieces of the following information of the resource:

a frequency domain location of an RBG included in the resource and a quantity of RBs included in the RBG;

a format of control information corresponding to the resource;

a payload type of control information corresponding to the resource; or a pattern of the resource.

For specific content and definitions of the foregoing information, refer to the following descriptions. Details are not described herein.

Certainly, the foregoing is merely an example, and the resource configuration information may further indicate other information of the resource. This is not described herein by using examples one by one. The information of the resource may be carried in different information elements of one piece of signaling, or may be carried in different signaling. This is not limited herein.

In this embodiment of this application, the resource configuration information may be implemented in a plurality of possible manners, which are described in detail below.

First Possible Implementation:

Specifically, the resource configuration information may include but is not limited to one or more of the following:

1. A frequency domain resource identifier: The frequency domain resource identifier is an identifier of a frequency domain resource in which the resource indicated by the resource configuration information is located.

The frequency domain resource may be referred to as a segment of contiguous frequencies, for example, may be referred to as entire system bandwidth configured for the terminal, or may be referred to as a bandwidth part (bandwidth part, BWP) in system bandwidth. Correspondingly, the frequency domain resource identifier may be a bandwidth part identifier (such as an index or a number), or the like.

2. An RBG bitmap: The RBG bitmap is used to indicate a location, in a frequency domain resource, of an RBG included in the resource indicated by the resource configuration information.

3. RBG capacity information: The RBG capacity information indicates a quantity of RBs included in one RBG 4. The format of the control information corresponding to the resource indicated by the resource configuration information: The format of the control information may indicate a type of the control information and/or a quantity of bits of the control information, or may indicate a quantity of symbols or RBs occupied by the resource.

5. A payload type of the resource indicated by the resource configuration information: The payload type of the resource indicated by the resource configuration information is classified based on a payload size of the control information corresponding to the resource indicated by the resource configuration information.

For example, when the resource is a PUCCH resource, a payload type of the resource is a PUCCH payload type. The PUCCH payload type may be classified based on a payload size of uplink control information transmitted by using the PUCCH resource. For example, a PUCCH payload type 1 means that a payload size of the uplink control information transmitted by using the PUCCH resource is 2 bits to 20 bits; a PUCCH payload type 2 means that a payload size of the uplink control information transmitted by using the PUCCH resource is 20 bits to 40 bits; and a PUCCH payload type 3 means that a payload size of the uplink control information transmitted by using the PUCCH resource is 40 bits to 150 bits. Certainly, the foregoing is merely an example, and the PUCCH payload type may be further classified in another manner. This is not described herein by using examples one by one. In one embodiment, different payload types may correspond to different payload sizes.

In this embodiment of this application, L bits in the RBG bitmap correspond to one RBG, where L is an integer greater than or equal to 1. It should be noted that, in this embodiment of this application, RBs included in an RBG may be contiguous, or may be obtained through division according to a specific rule. The rule may be as follows: At least one contiguous RB constitutes one RBG; or at least one non-contiguous RB constitutes one RBG, for example, one or more RBs exist between RBs that constitute the RBG; or at least one specific non-contiguous RB constitutes the RBG After the rule is defined, the rule may be preconfigured in the access network device and the terminal. When there is a plurality of division rules, the rule may be determined by the access network device and the terminal based on information related to the division rule, or may be notified by the access network device to the terminal.

In one embodiment, in this embodiment of this application, a value of L bits corresponding to an RBG in the resource in the RBG bitmap is a first value, and a value of a bit other than the L bits corresponding to the RBG in the resource in the RBG bitmap is a second value. The second value is one or more values other than the first value.

When the value of the L bits corresponding to the RBG is the first value, it indicates that the RBG is an RBG included in the PUCCH resource. Correspondingly, when the value of the L bits corresponding to the RBG is the second value, it indicates that the RBG is not an RBG included in the resource.

It should be noted that, in the RBG bitmap, a correspondence between a bit and an RBG may be pre-agreed upon, and the first value and the second value may also be pre-agreed upon. Details are not described herein again.

Figure 3:
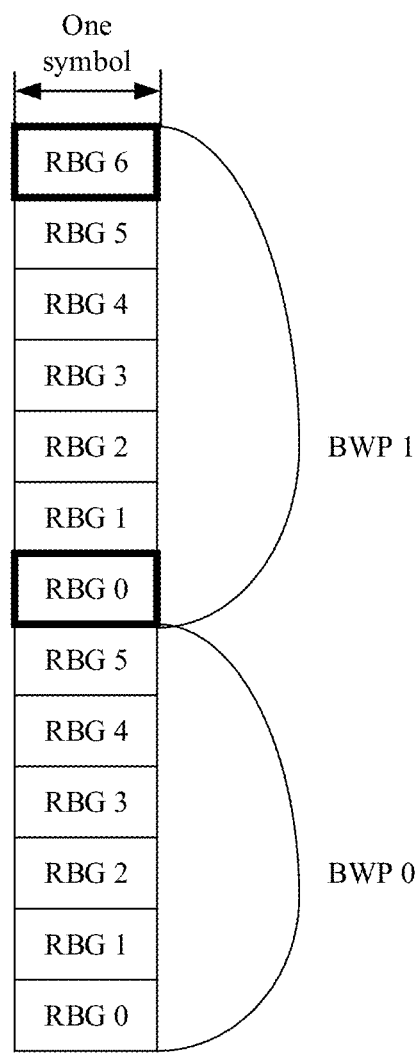
FIG. 3 is a schematic diagram of resource distribution according to an embodiment of this application.

For example, the resource indicated by the resource configuration information is the PUCCH resource, the frequency domain resource identifier is a BWP identifier, and L is 1. In other words, one bit in the RBG bitmap corresponds to one RBG As shown in FIG. 3, system bandwidth includes two BWPs, and corresponding BWP identifiers are a BWP 0 and a BWP 1 respectively. The BWP 0 includes six RBGs, which are respectively represented by an RBG 0 to an RBG 5. The BWP 1 includes seven RBGs, which are respectively represented by an RBG 0 to an RBG 6. Each RBG includes two contiguous RBs. A PUCCH resource allocated by the access network device is located in the BWP 1. The PUCCH resource includes the RBG 0 and the RBG 6 in the BWP 1. In this case, when the resource configuration information includes the frequency domain resource identifier, the frequency domain resource identifier may be the BWP 1; and when the resource configuration information includes the RBG bitmap, the RBG bitmap may be 1000001. Bits from left to right in the RBG bitmap are respectively corresponding to the RBG 0 to the RBG 6 in the BWP 1. When a value of a bit is 1, it indicates that an RBG corresponding to the bit is an RBG allocated to the PUCCH resource. Correspondingly, when a value of a bit is 0, it indicates that an RBG corresponding to the bit is not an RBG allocated to the PUCCH resource.

According to the foregoing method, the location of the RBG included in the resource indicated by the resource configuration information is indicated by using the RBG bitmap. The access network device may configure non-contiguous PUCCH resources, thereby improving a frequency domain diversity gain.

In this embodiment of this application, when the resource is the PUCCH resource, the format of the control information may be referred to as a PUCCH format. The PUCCH format may refer to at least one or a combination of the following cases:

(1) The PUCCH format may be in a correspondence with a quantity of time domain resources (for example, a quantity of symbols) and/or a quantity of frequency domain resources (for example, a quantity of RBs) occupied by the PUCCH resource.

For example, the PUCCH format is determined based on the quantity of symbols occupied by the PUCCH resource. Specifically, for example, one to two occupied symbols correspond to a first PUCCH format, and more than two occupied symbols correspond to a second PUCCH format. The first PUCCH format and the second PUCCH format are merely examples, and the correspondence is also merely an example. Details about another case are not described herein.

(2) The PUCCH format may be in a correspondence with a quantity of bits (and/or a payload type) of control information transmitted (or born or carried) by using the PUCCH resource.

For example, when the quantity of bits of the transmitted control information is less than two bits, the bit quantity corresponds to the first PUCCH format; or when the quantity of bits of the transmitted control information is greater than two bits, the bit quantity corresponds to the second PUCCH format. Specifically, the first PUCCH format and the second PUCCH format are merely examples, and the correspondence is also merely an example. Details about another case are not described herein.

(3) The PUCCH format may be in a correspondence with a type of control information transmitted (or born or carried) by using the PUCCH resource.

In one embodiment, the type of the control information may include at least one of ACK/NACK, CSI, or a scheduling request (SR). The CSI may include at least one of a rank indication (RI), a precoding matrix indicator (PMI), or a channel quality indicator (CQI), and the like.

For example, when ACK/NACK is transmitted by using the PUCCH resource, the type of the control information corresponds to the first PUCCH format; or when the CQI is transmitted by using the PUCCH resource, the type of the control information corresponds to the second PUCCH format. Specifically, the first PUCCH format and the second PUCCH format are merely examples, and the correspondence is also merely an example. Details about another case are not described herein.

(4) The PUCCH format may be in a correspondence with a modulation scheme of control information corresponding to the PUCCH resource. For example, when the modulation scheme of the control information corresponding to the PUCCH resource is binary phase shift keying, the modulation scheme corresponds to the first PUCCH format; or when the modulation scheme of the control information corresponding to the PUCCH resource is quadrature phase shift keying, the modulation scheme corresponds to the second PUCCH format. Specifically, the first PUCCH format and the second PUCCH format are merely examples, and the correspondence is also merely an example. Details about another case are not described herein.

In one embodiment, the PUCCH format may be in a correspondence with at least one of the quantity of symbols occupied by the PUCCH resource, the quantity of occupied RBs, the type of the control information transmitted (or born or carried) by using the PUCCH resource, the quantity of bits of the control information transmitted on the PUCCH, and the modulation scheme of the control information. For example, the PUCCH format may be determined based on at least one of the quantity of symbols occupied by the PUCCH resource, the quantity of occupied RBs, the type of the control information transmitted (or born or carried) by using the PUCCH resource, the quantity of bits of the control information transmitted (or born or carried) on the PUCCH, and the modulation scheme of the control information.

For example, as shown in Table 1, the PUCCH format may be determined based on the quantity of symbols occupied by the PUCCH resource and the quantity of bits of the control information transmitted (or born or carried) on the PUCCH. This may be at least one case in the table. Values (for example, a specific value may be described by using a first value or a second value) and correspondences in Table 1 are merely examples, and another value and/or correspondence may alternatively be used. This is not limited herein.

TABLE 1

| PUCCH format | Quantity of occupied symbols | Quantity of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

It may be understood that a relationship between the PUCCH format and one or both of the quantity of symbols occupied by the PUCCH resource and the quantity of bits of the control information may be one or more of correspondences in the table above. A specific value of the PUCCH format is used as an index of the PUCCH format, and is not limited to the examples provided in the table above. Alternatively, the specific value may be another value, and may be replaced with the first value or the second value.

For another example, as shown in Table 2, the PUCCH format may be determined based on at least one of the type of the control information transmitted (or born or carried) by using the PUCCH resource, the quantity of bits of the control information transmitted (or born or carried) on the PUCCH, and the modulation scheme of the control information. This may be at least one case in the table. Values and correspondences in Table 2 are merely examples, and another value and/or correspondence may alternatively be used. This is not limited herein.

TABLE 2

| PUCCH format | Type of control information | Modulation scheme | Quantity of bits |
| --- | --- | --- | --- |
| 1 | Uplink scheduling request indicator | N/A | N/A |
| 1a | 1-bit ACK | Binary phase shift keying | 1 |
| 1b | 2-bit ACK | Quadrature phase shift keying | 2 |
| 2 | CQI | Quadrature phase shift keying | 20 |

It may be understood that a relationship between the PUCCH format and one or more of the type of the control information, an adjustment manner, and the quantity of bits may be one or more of correspondences in the table above. A specific value of the PUCCH format is used as an index of the PUCCH format, and is not limited to the examples provided in the table above. Alternatively, the specific value may be another value, and may be replaced with the first value or the second value.

In this embodiment of this application, the resource configuration information may alternatively not include the frequency domain resource identifier. When the resource configuration information does not include the frequency domain resource identifier, the resource indicated by the resource configuration information is in a default activated frequency domain resource, or the resource indicated by the resource configuration information is in entire bandwidth.

In this embodiment of this application, when the resource configuration information does not include the RBG capacity information, the RBG capacity information may be determined in the following implementations.

In one embodiment, a quantity of RBs included in each RBG may be a preset quantity. In this implementation, the quantity of RBs included in each RBG may be agreed upon according to a protocol. Both the access network device and the terminal can determine, based on a value agreed in the protocol, the quantity of RBs included in each RBG In one embodiment, a quantity of RBs included in each RBG may also be in a correspondence with one or more of the format of the control information corresponding to the resource, the payload type of the resource, the payload size of the control information corresponding to the resource, and bandwidth of a frequency domain resource corresponding to the frequency domain resource identifier. Detailed descriptions are provided below. A correspondence 1 is a correspondence between the quantity of RBs included in the RBG and the format of the control information corresponding to the resource. In this implementation, the quantity of RBs included in the RBG is determined based on the format of the control information corresponding to the resource.

For example, when the resource is a PUCCH resource, and the format of the control information corresponding to the resource is a PUCCH format, a correspondence between the quantity of RBs included in the RBG and the PUCCH format may be at least one of correspondences in Table 3.

TABLE 3

| Quantity of RBs included in an RBG | PUCCH format |
| --- | --- |
| 2 | First PUCCH format |
| 3 | Second PUCCH format |
| 4 | Third PUCCH format |
| 5 | Fourth PUCCH format |

In Table 3, when the PUCCH format is the first PUCCH format, each RBG includes two RBs; when the PUCCH format is the second PUCCH format, each RBG includes three RBs; or the like.

The first PUCCH format, the second PUCCH format, the third PUCCH format, and the fourth PUCCH format in Table 3 are merely examples, and may refer to one or more types of the foregoing PUCCH formats. Specifically, this is not limited herein. Values and correspondences in the table are merely examples, and another value and correspondence may alternatively be used. Specifically, this is not limited herein.

Certainly, the foregoing is merely an example. The correspondence between the quantity of RBs included in the RBG and the format of the control information corresponding to the resource may alternatively be in another form. Details are not described herein.

A correspondence 2 is a correspondence between the quantity of RBs included in the RBG and a PUCCH payload type. In this implementation, the quantity of RBs included in the RBG is determined based on the payload type of the resource.

For example, when the resource is a PUCCH resource, and the payload type of the resource is the PUCCH payload type, the correspondence between the quantity of RBs included in the RBG and the PUCCH payload type may be shown in Table 4.

TABLE 4

| Quantity of RBs included in an RBG | PUCCH payload type |
|---|---|
| 1 | PUCCH payload type 1 |
| 2 | PUCCH payload type 2 |
| 4 | PUCCH payload type 3 |

Certainly, the foregoing is merely an example. The correspondence between the quantity of RBs included in the RBG and the PUCCH payload type may be one or more of correspondences in the table above, or may be in another form. Details are not described herein. A specific value of the PUCCH payload type is not limited to the examples provided in the table above, and may alternatively be another value. Details are not described herein.

A correspondence 3 is a correspondence between the quantity of RBs included in the RBG and each of the format of the control information corresponding to the resource and the payload type of the resource. In this implementation, the quantity of RBs included in the RBG is determined based on the format of the control information corresponding to the resource and the payload type of the resource.

For example, when the resource is a PUCCH resource, the format of the control information corresponding to the resource is a PUCCH format, and the payload type of the resource is a PUCCH payload type, the correspondence between the quantity of RBs included in the RBG and each of the PUCCH format and the PUCCH payload type may be shown in Table 5.

TABLE 5

| Quantity of RBs included in an RBG | PUCCH format | PUCCH payload type |
|---|---|---|
| 2 | First PUCCH format | PUCCH payload type 1 |
| 3 | First PUCCH format | PUCCH payload type 2 |
| 4 | Second PUCCH format | PUCCH payload type 3 |
| 5 | Third PUCCH format | PUCCH payload type 3 |

The correspondence between the quantity of RBs included in the RBG, and one or both of the PUCCH format and the PUCCH payload type may be one or more of correspondences in the table above, and may alternatively be in another form. Details are not described herein. Specific values of the PUCCH format and the PUCCH payload type are not limited to the examples provided in the table above, and may alternatively be other values. Details are not described herein.

In this implementation, with reference to the PUCCH format and the PUCCH payload type, a status of a resource required for the PUCCH may be comprehensively considered, to implement more accurate and proper resource allocation, thereby avoiding resource waste and contention.

A correspondence 4 is a correspondence between the quantity of RBs included in the RBG and the payload size of the control information corresponding to the resource. In this implementation, the quantity of RBs included in the RBG is determined based on the payload size of the control information corresponding to the resource.

For example, when the resource is a PUCCH resource, and the payload size of the control information corresponding to the resource is a payload size of uplink control information transmitted by using the PUCCH resource, a correspondence between the quantity of RBs included in the RBG and the payload size of the uplink control information transmitted by using the PUCCH resource may be at least one of correspondences shown in Table 6.

TABLE 6

| Quantity of RBs included in an RBG | Payload size of uplink control information transmitted by using a PUCCH resource |
|---|---|
| 2 | First payload size |
| 3 | Second payload size |
| 4 | Third payload size |

For example, the first payload size may be 1 bit to 20 bits, the second payload size may be 21 bits to 40 bits, and the third payload size may be greater than 40 bits. A specific value of the payload size of the uplink control information transmitted by using the PUCCH resource is not limited to the foregoing example, and may alternatively be another value. Details are not described herein.

Certainly, the foregoing is merely an example. The correspondence between the quantity of RBs included in the RBG and the payload size of the uplink control information transmitted by using the PUCCH resource may alternatively be in another form. Details are not described herein. Values and correspondences in the table are merely examples, and another value and correspondence may alternatively be used. Specifically, this is not limited herein.

A correspondence 5 is a correspondence between the quantity of RBs included in the RBG and the bandwidth of the frequency domain resource corresponding to the frequency domain resource identifier. In this implementation, the quantity of RBs included in the RBG is determined based on the bandwidth of the frequency domain resource corresponding to the frequency domain resource identifier.

For example, the correspondence between the quantity of RBs included in the RBG and the bandwidth of the frequency domain resource corresponding to the frequency domain resource identifier may be at least one of correspondences shown in Table 7 or Table 8.

TABLE 7

| Quantity of RBs included in an RBG | Bandwidth of a frequency domain resource corresponding to a frequency domain resource identifier |
|---|---|
| 2 | First bandwidth |
| 4 | Second bandwidth |
| 6 | Third bandwidth |

TABLE 8

| Quantity of RBs included in an RBG | Bandwidth of a frequency domain resource corresponding to a frequency domain resource identifier (in a unit of a physical resource block (physical resource block, PRB)) |
|---|---|
| 1 | Fourth bandwidth |
| 2 | Fifth bandwidth |
| 4 | Sixth bandwidth |

In Table 7, the first bandwidth may be 20 M, the second bandwidth may be 40 M, and the third bandwidth may be 80 M. In Table 8, the fourth bandwidth may be 0 PRBs to 24 PRBs, the fifth bandwidth may be 25 PRBs to 72 PRBs, and the sixth bandwidth may be 73 PRBs to 144 PRBs. A specific value of the bandwidth of the frequency domain resource corresponding to the frequency domain resource identifier is not limited to the foregoing example, and may alternatively be another value. Details are not described herein.

Certainly, the foregoing is merely an example. The correspondence between the quantity of RBs included in the RBG and the bandwidth of the frequency domain resource corresponding to the frequency domain resource identifier may alternatively be in another form. Details are not described herein. Values and correspondences in the table are merely examples, and another value and correspondence may alternatively be used. Specifically, this is not limited herein.

A correspondence 6 is a correspondence between the quantity of RBs included in the RBG and each of the format of the control information corresponding to the resource and the bandwidth of the frequency domain resource corresponding to the frequency domain resource identifier. In this implementation, the quantity of RBs included in the RBG may be determined based on the format of the control information corresponding to the resource and the bandwidth of the frequency domain resource corresponding to the frequency domain resource identifier.

For example, when the resource is a PUCCH resource, and the format of the control information corresponding to the resource is a PUCCH format, the correspondence between the quantity of RBs included in the RBG and one or both of the PUCCH format and the bandwidth of the frequency domain resource corresponding to the frequency domain resource identifier may be at least one of correspondences shown in Table 9.

A first PUCCH format, a second PUCCH format, first bandwidth, second bandwidth, and third bandwidth in Table 9 are merely examples, and may refer to one or more types of the foregoing PUCCH formats and one or more types of bandwidth of the frequency domain resources corresponding to the frequency domain resource identifiers. Specifically, this is not limited herein. Values and correspondences in the table are merely examples, and another value and correspondence may alternatively be used. Specifically, this is not limited herein.

TABLE 9

| Quantity of RBs included in an RBG | PUCCH format | Bandwidth of a frequency domain resource corresponding to a frequency domain resource identifier |
|---|---|---|
| 1 | First PUCCH format | First bandwidth |
| 2 | Second PUCCH format | First bandwidth |
| 4 | First PUCCH format | Second bandwidth |
| 6 | Second PUCCH format | Second bandwidth |
| 6 | First PUCCH format | Third bandwidth |

With reference to the foregoing descriptions, the quantity of RBs included in each RBG in the PUCCH resource indicated by the resource configuration information may be determined based on any one or more of the foregoing correspondences. Therefore, the access network device may not need to send the RBG capacity information.

The foregoing correspondences 1 to 6 are merely examples. The quantity of RBs included in the RBG may alternatively be determined based on another correspondence. This is not described herein by using examples one by one.

In one embodiment, the foregoing embodiment may be used as an independent embodiment, or may be combined with another embodiment in this application. Specifically, this is not limited herein.

It should be noted that any one or more of the foregoing correspondences may be predefined in a protocol, or may be notified by the access network device to the terminal by using signaling. This is not limited in this embodiment of this application. In this embodiment of this application, a correspondence rule may be further pre-determined. The access network device and the terminal separately determine one or more of the foregoing correspondences according to the rule which is agreed upon in advance. Details are not described herein.

It should be noted that, based on the foregoing descriptions, when the resource configuration information does not include the RBG capacity information, and the access network device configures a resource, the access network device may determine, based on a quantity of RBs which is agreed upon in advance or a quantity of RBs corresponding to any one of the foregoing correspondences, the quantity of RBs included in the RBG Correspondingly, the terminal may determine, based on the quantity of RBs which is agreed upon in advance or the quantity of RBs corresponding to any one of the foregoing correspondences, the quantity of RBs included in the RBG; and then determine one or more of the frequency domain resource identifier, the RBG bitmap, the format of the control information corresponding to the resource, the payload type of the resource, and the like with reference to the resource configuration information sent by the access network device, to determine information such as a resource configured by the access network device.

In this embodiment of this application, the resource configuration information may not include the format of the control information corresponding to the resource. In this case, the access network device and/or the terminal may determine, by using a correspondence between a resource and a format of control information, the format of the control information corresponding to the resource.

In one embodiment, the correspondence between the resource and the format of the control information may include a correspondence between the format of the control information and at least one of a size of a time domain resource, a size of a frequency domain resource, a quantity of RBs included in an RBG, and a resource identifier (an index or a number) of the resource. After at least one of the size of the time domain resource, the size of the frequency domain resource, and the resource identifier (the index or the number) of the resource is determined, the format of the control information may be determined based on the foregoing correspondence.

In one embodiment, the foregoing correspondence may be the correspondence of the PUCCH format described in this embodiment of this application.

In one embodiment, for the correspondence between the quantity of RBs included in the RBG and the format of the control information, refer to the descriptions in this embodiment of the present invention. Specifically, details are not described herein again.

In one embodiment, the correspondence between the format of the control information and at least one of the size of the frequency domain resource, and the resource identifier (the index or the number) may be at least one of correspondences in Table 10.

TABLE 10

| At least one of a size of a time domain resource, a size of a frequency domain resource, and a resource identifier | Format of control information |
|---|---|
| At least one of a size of a first time domain resource, a size of a first frequency domain resource, and a first resource identifier | Format of first control information |
| At least one of a size of a second time domain resource, a size of a second frequency domain resource, and a second resource identifier | Format of second control information |
| At least one of a size of a third time domain resource, a size of a third frequency domain resource, and a third resource identifier | Format of third control information |

The size of the first time domain resource, the size of the first frequency domain resource, the first resource identifier, the format of the first control information, and the like in Table 10 are merely examples. For example, the first time domain resource is one to two symbols, the second time domain resource is four to fourteen symbols, the size of the first frequency domain resource may be four RBs, the size of the second frequency domain resource may be eight RBs, and the size of the third frequency domain resource may be one RB. For example, the format of the first control information may be a format 0 of control information, the format of the second control information may be a format 1 of control information, and the format of the third control information may be a format 2 of control information. A specific value is not limited herein. Values and correspondences in the table are merely examples, and another value and correspondence may alternatively be used. Specifically, this is not limited herein.

Correspondingly, when the resource configuration information does not include the format of the control information corresponding to the resource, the terminal may determine, based on any one of the foregoing correspondences or in a manner such as a predefined manner in a protocol, the format of the control information corresponding to the resource; and then determine, based on the resource configuration information sent by the access network device, information of the resource configured by the access network device.

Specifically, when the access network device and the terminal determine the format of the control information corresponding to the resource, the access network device may indicate the resource (for example, by using DCI) by indicating one or more resources in the resource corresponding to the format of the control information (to be specific, a number or an index (also referred to as an identifier) of the resource uses the format of the control information as a dimension, formats of different control information correspond to different resources (quantities of corresponding resources may be the same or may be different), and numbers or indexes of the resources may be the same or may be different). For example, the access network device configures four resources by using the resource configuration information (for example, resource configuration information carried in RRC or a MAC CE). The format 1 of the control information corresponds to a first resource (an index is a resource 0) and a second resource (an index is a resource 1). The format 2 of the control information corresponds to a third resource (an index is a resource 0) and a fourth resource (an index is a resource 1). In this case, the access network device may indicate the resource by using one bit (for example, indicating the resource as the resource 0 or the resource 1) (for example, by using the DCI). After receiving the indication, with reference to a format of current control information (for a method for determining the format of the current control information, refer to descriptions in another part of the embodiments of this application), for example, when the format of the current control information is the format 1, the terminal may determine that the resource is the resource 0 or the resource 1 corresponding to the format 1 of the control information. If the format of the current control information is the format 2, the terminal may determine that the resource is the resource 0 or the resource 1 corresponding to the format 2 of the control information.

In this way, the format of the control information corresponding to the resource is determined, thereby reducing resource indication overheads.

In one embodiment, the number or the index (also referred to as the identifier) of the resource may not use the format of the control information as a dimension. To be specific, numbers or indexes of different resources may be different. In this way, after receiving a resource identifier indicated by the access network device, the terminal may directly determine a corresponding resource based on the resource identifier. For example, the access network device configures four resources by using the resource configuration information (for example, the resource configuration information carried in the RRC or the MAC CE), and may indicate one of the four resources by using two bits in the DCI.

In one embodiment, resource indication information in the DCI may be the number, the index, or the identifier of the resource, or may be information that is in a one-to-one correspondence with the number, the index, or the identifier of the resource. This is not limited in this embodiment of this application.

In one embodiment, the resource configuration information may not include the payload type of the resource. When the resource configuration information does not include the payload type of the resource, the payload type of the resource may be determined based on the payload size of the control information corresponding to the resource indicated by the resource configuration information. For a specific method of the determining, refer to the foregoing descriptions. Details are not described herein again. When the resource configuration information does not include the payload type of the resource, the payload type of the resource may alternatively be determined in another manner, for example, by predefining a payload type of a resource. This is not described herein by using examples one by one. Correspondingly, when the resource configuration information may not include the payload type of the resource, the terminal may determine the payload type of the resource by using the payload size of the control information; or use the predefined payload type as the payload type of the resource, and then determine, with reference to the resource configuration information sent by the access network device, the information about the resource configured by the access network device.

In one embodiment, the resource configuration information may not include the RBG bitmap. When the resource configuration information does not include the RBG bitmap, an RBG included in the resource indicated by the resource configuration information may be in a correspondence with one or more of the format of the control information corresponding to the resource, the payload type of the resource, the payload size of the control information corresponding to the resource, or the bandwidth of the frequency domain resource corresponding to the frequency domain resource identifier. Alternatively, the RBG may be in a correspondence with a number configured for the PUCCH resource. The number configured for the PUCCH resource is a sequence number used to represent a configured PUCCH. For example, a first PUCCH resource is a number 0, and a second PUCCH resource is a number 1. Alternatively, another numbering rule may be used. This is not limited. A specific form of the foregoing correspondence is not limited in this embodiment of this application. For example, when the resource indicated by the resource configuration information is a PUCCH resource, an RBG included in the PUCCH resource is in a correspondence with at least one of a PUCCH format, a PUCCH payload type, or a PUCCH payload size. The access network device and/or the terminal may determine, based on the correspondence, the RBG included in the PUCCH resource. For example, a correspondence between the RBG included in the PUCCH resource and the PUCCH format may be as follows: The first PUCCH format corresponds to an RBG 0 and an RBG 4 (a number after an RBG such as 0 or 4 is an index or a number of the RBG); and the second PUCCH format corresponds to an RBG 1, an RBG 5, and the like. When the PUCCH format is the first PUCCH format, it may be determined that the resource indicated by the resource configuration information includes the RBG 0 and the RBG 4. In one embodiment, the foregoing correspondence may be predefined in a protocol, or notified by the access network device to the terminal. Specifically, this is not limited herein. Correspondingly, when the resource configuration information may not include the RBG bitmap, the terminal may determine the RBG bitmap based on any one of the foregoing correspondences or in a manner such as a predefined manner in a protocol, to determine a location of the RBG included in the resource in the frequency domain resource; and then determine, with reference to the resource configuration information sent by the access network device, the information about the resource configured by the access network device.

It should be noted that the access network device may simultaneously configure a plurality of PUCCH resources (for example, send, to the terminal, resource configuration information used to indicate a plurality of PUCCH resources). If the plurality of PUCCH resources are configured, the access network device may further use downlink control information (downlink control information, DCI) to indicate a resource. In this way, the terminal may select, based on an indication in the DCI, at least one PUCCH resource from the plurality of PUCCH resources configured by the access network device, to transmit uplink control information.

The access network device may configure the plurality of PUCCH resources in a plurality of manners. For example, the access network device may configure a PUCCH resource by using radio resource control (radio resource control, RRC) signaling, a media access control control element (media access control control element, MAC CE), and the like. The resource configuration information may alternatively be sent to the terminal by using higher layer signaling such as the RRC signaling or the MAC CE.

For example, the access network device configures four PUCCH resources by using the RRC signaling, and the access network device may further indicate, by using two bits in the DCI, a PUCCH resource specifically used by the terminal. For example, when a value of the two bits is 00, the first PUCCH resource is indicated; when a value of the two bits is 01, the second PUCCH resource is indicated; when a value of the two bits is 10, a third PUCCH resource is indicated; and when a value of the two bits is 11, a fourth PUCCH resource is indicated. Certainly, the foregoing is merely an example, and the access network device may alternatively perform indication in another manner. Details are not described herein.

Second Possible Implementation:

The resource configuration information includes but is not limited to one or more of the following:

1. A frequency domain resource identifier: The frequency domain resource identifier is an identifier of a frequency domain resource in which the resource indicated by the resource configuration information is located.

The frequency domain resource may be referred to as a segment of contiguous frequencies, for example, may be referred to as entire system bandwidth configured for the terminal, or may be referred to as a bandwidth part in system bandwidth. Correspondingly, the frequency domain resource identifier may be a bandwidth part identifier, or the like.

2. A quantity of RBs included in the resource indicated by the resource configuration information.

It should be noted that in this implementation, the resource indicated by the resource configuration information may include only one RBG In this case, the quantity of RBs included in the resource indicated by the resource configuration information is a quantity of RBs included in one RBG 3. A pattern (pattern) identifier: A pattern indicated by the pattern identifier is a pattern of the resource indicated by the resource configuration information, and RBs in the resource may be contiguous or discrete. In one embodiment, as described above, the RBs included in the pattern may constitute an RBG In one embodiment, in this embodiment of this application, the resource configuration information may alternatively not include the frequency domain resource identifier. When the resource configuration information does not include the frequency domain resource identifier, the resource indicated by the resource configuration information is in a default activated frequency domain resource, or the resource indicated by the resource configuration information is in entire bandwidth.

In one embodiment, in this embodiment of this application, the quantity of RBs may be in a correspondence with the pattern, and each quantity of RBs may correspond to at least one pattern.

Figure 4:
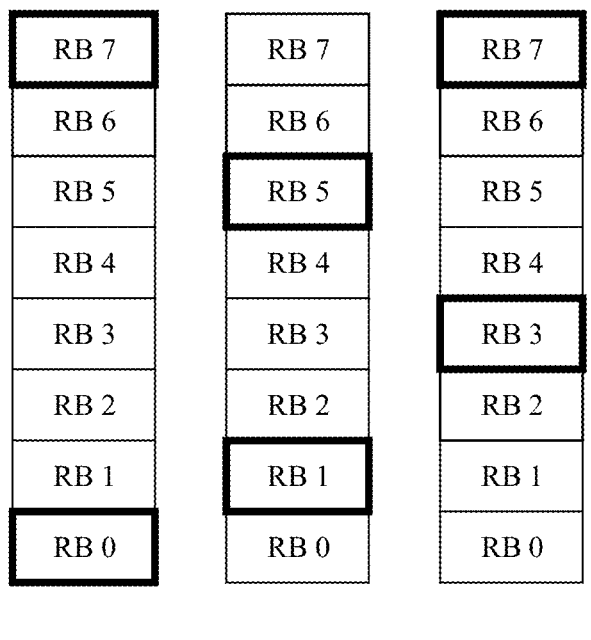
FIG. 4 is a schematic diagram of a pattern according to an embodiment of this application.

For example, when the resource is a PUCCH resource, and a quantity of RBs included in the PUCCH resource is 2, a corresponding pattern may be shown in FIG. 4. In FIG. 4, when the quantity of RBs included in the PUCCH resource is 2, the quantity of RBs corresponds to at least one of three patterns: a pattern 1, a pattern 2, and a pattern 3 respectively. An example in which a frequency domain resource in which the PUCCH resource is located includes eight RBs, and numbers are respectively an RB 0 to an RB 7 is used for description.

The pattern 1 may include a first RB and a last RB in the frequency domain resource, such as the RB 0 and the RB 7.

The pattern 2 may include a second RB and a penultimate RB in the frequency domain resource, such as an RB 1 and an RB 6.

The pattern 3 may include the first RB and a fourth RB in the frequency domain resource, such as the RB 0 and an RB 3.

Certainly, when the quantity of RBs included in the PUCCH resource is 2, the quantity of RBs may correspond to another pattern. For example, the quantity of RBs corresponds to at least one of the following patterns.

A pattern 4 may include a second RB and a middle RB in the frequency domain resource, such as an RB numbered RB ($\lfloor N_s/2 \rfloor$+1) or RB ($\lceil N_s/2 \rceil$+1). By analogy, other cases may be obtained. Herein, $N_S$ represents a quantity of RBs included in the frequency domain resource, $\lfloor \ \rfloor$ represents a rounded-down operation, and $\lceil \ \rceil$ represents a rounded-up operation.

A pattern 5 may include the last RB and the middle RB in the frequency domain resource, such as an RB numbered RB ($\lfloor N_S/2 \rfloor$) or RB ($\lceil N_S/2 \rceil$). By analogy, other cases may be obtained.

A pattern 6 may include the penultimate RB and the middle RB in the frequency domain resource, such as an RB numbered RB ($\lfloor N_S/2 \rfloor - 1$) or RB ($\lceil N_S/2 \rceil - 1$). By analogy, other cases may be obtained.

Figure 5:
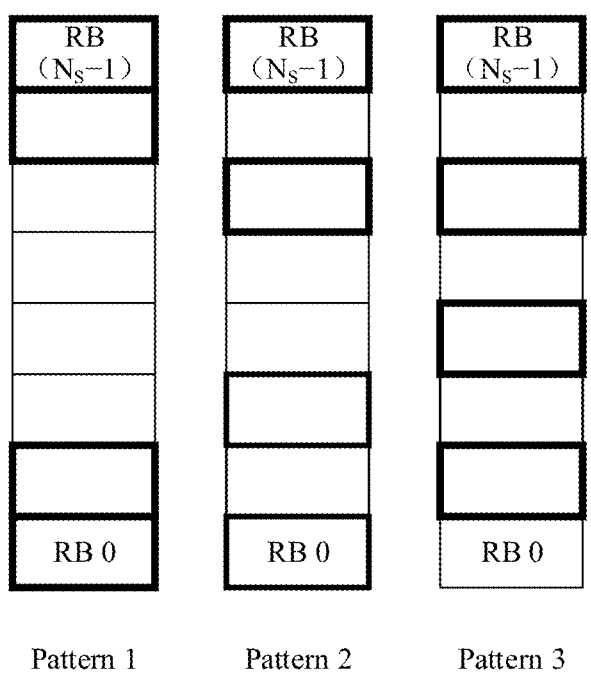
FIG. 5 is a schematic diagram of a pattern according to an embodiment of this application.

For another example, when a quantity of RBs included in the PUCCH resource is 4, a corresponding pattern may be shown in FIG. 5. In FIG. 5, when the quantity of RBs included in the PUCCH resource is 4, the quantity of RBs corresponds to at least one of three patterns: a pattern 1, a pattern 2, and a pattern 3 respectively. The frequency domain resource in which the PUCCH resource is located includes $N_S$ RBs whose numbers are respectively an RB 0 to an RB ($N_S$–1).

The pattern 1 may include a first RB, a second RB, a penultimate RB, and a last RB in the frequency domain resource, such as the RB 0, an RB 1, an RB ($N_S$–2), and the RB ($N_S$–1).

The pattern 2 may include the first RB, an RB at a middle ¼ location, an RB at a middle ¾ location, and the last RB in the frequency domain resource, such as the RB 0, an RB $\lceil N_S/4 \rceil$, an RB $\lfloor N_S \cdot 3/4 \rfloor$ and the RB ($N_S$–1). It should be noted that the RB number herein is merely used as an example for description, and does not have another meaning. For example, the RB $\lceil N_S/4 \rceil$ may also be replaced with an RB $\lfloor N_S/4 \rfloor$. An RB number in the following example is also used as an example for description, and may also be replaced with another RB number. An RB number is specifically determined based on an actual situation. This is not described again herein by using examples one by one.

The pattern 3 may include the second RB, the RB at a middle ¼ location, an RB at a middle ½ location, and the last RB in the frequency domain resource, such as the RB 1, the RB $\lceil N_S/4 \rceil$, an RB $\lfloor N_S/2 \rfloor$, and the RB ($N_S$–1).

Certainly, when the quantity of RBs included in the PUCCH resource is 4, the quantity of RBs may correspond to another pattern. For example, the quantity of RBs corresponds to at least one of the following patterns.

A pattern 4 may include a third RB, a fourth RB, an antepenultimate RB, and a fourth last RB in the frequency domain resource, such as an RB 2, an RB 3, an RB ($N_S$–4), and an RB ($N_S$–3).

A pattern 5 may include the first RB, the RB at a middle ¼ location, the RB at a middle ½ location, and the penultimate RB in the frequency domain resource, such as the RB 0, the RB $\lceil N_S/4 \rceil$, the RB $\lfloor N_S/2 \rfloor$, and the RB ($N_S$–2).

A pattern 6 may include the second RB, an RB whose number is 1 plus a number of the RB at a middle ¼ location, an RB whose number is 1 plus a number of the RB at a middle ½ location, and an RB whose number is 1 plus a number of the RB at a middle ¾ location in the frequency domain resource, such as the RB 1, an RB ($\lceil N_S/4 \rceil + 1$), an RB ($\lfloor N_S/2 \rfloor + 1$), and an RB ($\lfloor N_S \cdot 3/4 \rfloor + 1$).

A pattern 7 may include the second RB, an RB whose number is a number of the RB at a middle ¼ location minus 1, an RB whose number is a number of the RB at a middle ½ location minus 1, and an RB whose number is a number of the RB at a middle ¾ location minus 1 in the frequency domain resource, such as the RB 1, an RB ($\lceil N_S/4 \rceil - 1$), an RB ($\lceil N_S/2 \rceil - 1$), and an RB ($\lfloor N_S \cdot 3/4 \rfloor - 1$).

When the quantity of RBs included in the PUCCH resource is 4, other corresponding patterns are not described by using examples one by one.

For another example, the frequency domain resource in which the PUCCH resource is located includes $N_S$ RBs whose numbers are respectively an RB 0 to an RB ($N_S$–1). When the quantity of RBs included in the PUCCH resource is 6, the quantity of RBs corresponds to one or more of the following patterns.

A pattern 1 may include a first RB, a second RB, a third RB, an antepenultimate RB, a penultimate RB, and a last RB in the frequency domain resource, such as an RB 0, an RB 1, an RB 2, an RB ($N_S$–3), an RB ($N_S$–2), and an RB ($N_S$–1).

A pattern 2 may include a fourth RB, a fifth RB, a sixth RB, a fourth last RB, a fifth last RB, and a sixth last RB in the frequency domain resource, such as an RB 3, an RB 4, an RB 5, an RB ($N_S$–4), an RB ($N_S$–5), and an RB ($N_S$–6).

A pattern 3 may include the first RB, an RB at a middle ⅙ location, an RB at a middle ⅔6 location, an RB at a middle ⅜6 location, an RB at a middle ⅘6 location, and the last RB in the frequency domain resource, such as the RB 0, an RB $\lceil N_S/6 \rceil$, an RB $\lceil N_S \cdot 2/6 \rceil$, an RB $\lceil N_S \cdot 3/6 \rceil$, an RB $\lceil N_S \cdot 4/6 \rceil$, and the RB ($N_S$–1).

A pattern 4 may include the first RB, the RB at a middle ⅙ location, the RB at a middle ⅔6 location, the RB at a middle ⅜6 location, the RB at a middle ⅘6 location, and an RB at a middle ⅝6 location in the frequency domain resource, such as the RB 0, the RB $\lceil N_S/6 \rceil$, the RB $\lceil N_S \cdot 2/6 \rceil$, the RB $\lceil N_S \cdot 3/6 \rceil$, the RB $\lceil N_S \cdot 4/6 \rceil$, and an RB $\lfloor N_S \cdot 5/6 \rfloor$.

A pattern 5 may include the second RB, an RB whose number is 1 plus a number of the RB at a middle ⅙ location, an RB whose number is 1 plus a number of the RB at a middle ⅔6 location, an RB whose number is 1 plus a number of the RB at a middle ⅜6 location, an RB whose number is 1 plus a number of the RB at a middle ⅘6 location, and an RB whose number is 1 plus a number of the RB at a middle ⅝6 location in the frequency domain resource, such as the RB 1, an RB ($\lceil N_S/6 \rceil + 1$), an RB ($\lceil N_S \cdot 2/6 \rceil + 1$), an RB ($\lceil N_S \cdot 3/6 \rceil + 1$), an RB ($N_S \cdot 4/6 + 1$), and an RB ($\lfloor N_S \cdot 5/6 \rfloor + 1$).

A pattern 6 may include the last RB, the RB at a middle ⅙ location, the RB at a middle ⅔6 location, the RB at a middle ⅜6 location, the RB at a middle ⅘6 location, and the RB at a middle ⅝6 location in the frequency domain resource, such as the RB ($N_S$–1), the RB $\lceil N_S/6 \rceil$, the RB $\lceil N_S \cdot 2/6 \rceil$, the RB $\lceil N_S \cdot 3/6 \rceil$, the RB $\lceil N_S \cdot 4/6 \rceil$, and the RB $\lfloor N_S \cdot 5/6 \rfloor$.

A pattern 7 may include the penultimate RB, an RB whose number is a number of the RB at a middle ⅙ location minus 1, an RB whose number is a number of the RB at a middle ⅔6 location minus 1, an RB whose number is a number of the RB at a middle ⅜6 location minus 1, an RB whose number is a number of the RB at a middle ⅘6 location minus 1, and an RB whose number is a number of the RB at a middle ⅝6 location minus 1 in the frequency domain resource, namely, the RB 1, an RB ($\lceil N_S/6 \rceil - 1$), an RB ($\lceil N_S \cdot 2/6 \rceil - 1$), an RB ($\lceil N_S/6 \rceil - 1$), an RB ($\lceil N_S \cdot 4/6 \rceil - 1$), and an RB ($\lfloor N_S \cdot 5/6 \rfloor - 1$).

Certainly, the foregoing is merely an example. When the quantity of RBs included in the PUCCH resource is 6, other patterns may be further corresponded. The other corresponding patterns are not described again by using examples one by one.

When the resource indicated by the resource configuration information includes another quantity of RBs, a corresponding pattern may be obtained by referring to the foregoing pattern. This is not described herein by using examples one by one.

It should be noted that when the quantity of RBs included in the resource indicated by the resource configuration information corresponds to at least one pattern, pattern identifiers of patterns corresponding to different quantities of RBs may be numbered independently, or pattern identifiers of patterns corresponding to different quantities of RBs may be numbered uniformly.

When the pattern identifiers of the patterns corresponding to the different quantities of RBs are numbered independently, there is no same pattern identifier in the pattern identifiers of the patterns corresponding to the different quantities of RBs, and each pattern is in a unique correspondence with a pattern identifier.

When the pattern identifiers of the patterns corresponding to the different quantities of RBs are numbered uniformly, there is a same pattern identifier in the pattern identifiers of the patterns corresponding to the different quantities of RBs, each pattern is in a correspondence with each of a pattern identifier and a quantity of RBs.

For example, when the pattern identifiers of the patterns corresponding to the different quantities of RBs are numbered independently, the quantity of RBs corresponds to two patterns when the quantity of RBs is 1, and the pattern identifiers are respectively 1 and 2; and the quantity of RBs corresponds to three patterns when the quantity of RBs is 2, and the pattern identifiers are respectively 1, 2, and 3. Because the pattern identifiers of the patterns corresponding to the different quantities of RBs are numbered independently, pattern identifiers corresponding to the different quantities of RBs may be the same. The pattern needs to be determined based on the quantity of RBs and the pattern identifier.

For example, when the pattern identifiers of the patterns corresponding to the different quantities of RBs are numbered uniformly, the quantity of RBs corresponds to two patterns when the quantity of RBs is 1, and the pattern identifiers are respectively 1 and 2; and the quantity of RBs corresponds to three patterns when the quantity of RBs is 2, and the pattern identifiers are respectively 3, 4, and 5. Because the pattern identifiers of the patterns corresponding to the different quantities of RBs are numbered uniformly, the different quantities of RBs correspond to different pattern identifiers. The pattern may be determined directly based on the pattern identifier.

In this embodiment of this application, the resource configuration information may alternatively not include the pattern identifier. For example, when the quantity of RBs corresponds to only one pattern, the access network device indicates the quantity of RBs, and the terminal may determine, based on the quantity of RBs included in the resource, the unique pattern corresponding to the quantity of RBs. In one embodiment, a specific pattern may be predefined in a protocol. Specifically, this is not limited herein.

In one embodiment, the pattern may be determined based on one or more of a quantity of RBs included in the resource, a format of control information corresponding to the resource, a payload type of the resource, a payload size of the control information corresponding to the resource, and bandwidth of a frequency domain resource corresponding to a frequency domain resource identifier. Specifically, a correspondence exists between a pattern and one or more of the foregoing items, so that the pattern can be determined based on the correspondence. An implementation of a specific correspondence is not limited in this embodiment of this application. Details are not described herein. Alternatively, the pattern may be determined based on other information. Specifically, this is not limited herein.

Specifically, the correspondence may be at least one of the following in Table 11.

TABLE 11

| | |
|---|---|
| One or more of a format of control information, a payload type of a resource, a payload size of the control information, and bandwidth of a frequency domain resource | Pattern |
| One or more of a format of first control information, a first payload type, a first payload size, and bandwidth of a first frequency domain resource | First pattern |
| One or more of a format of second control information, a second payload type, a second payload size, and bandwidth of a second frequency domain resource | Second pattern |
| One or more of a format of third control information, a third payload type, a third payload size, and bandwidth of a third frequency domain resource | Third pattern |

In Table 11, the format of the first control information, the first payload type, the first payload size, the bandwidth of the first frequency domain resource, or the like is merely an example. A specific value is not limited herein. Values and correspondences in the table are merely examples, and another value and correspondence may alternatively be used. Specifically, this is not limited herein.

In one embodiment, for the format of the first control information and the format of the second control information in the table in this embodiment of this application, refer to a format of control information described in another part of this application.

In one embodiment, for the first payload type and the second payload type in the table in this embodiment of this application, refer to a payload type described in another part of this application.

In one embodiment, for the first payload size and the second payload size in the table in this embodiment of this application, refer to a payload size described in another part of this application.

In one embodiment, for the bandwidth of the first frequency domain resource and the bandwidth of the second frequency domain resource in the table in this embodiment of this application, refer to bandwidth of a frequency domain resource described in another part of this application.

In one embodiment, a group of patterns may be further determined based on a quantity of RBs, and then one or more patterns in the group of patterns may be determined based on other information. The group of patterns may include one or more patterns. In one embodiment, the foregoing other information may be one or more of the format of the control information corresponding to the resource, the payload type of the resource, the payload size of the control information corresponding to the resource, and the bandwidth of the frequency domain resource corresponding to the frequency domain resource identifier. Specifically, for how to determine the one or more patterns in the group of patterns based on the other information, refer to the foregoing embodiment. Specifically, details are not described herein again. In this embodiment of this application, the resource configuration information may alternatively not include the quantity of RBs included in the resource indicated by the resource configuration information. Specifically, a correspondence exists between a pattern identifier and the quantity of RBs included in the resource, and the terminal may determine, based on the pattern identifier, the quantity of RBs included in the resource.

For example, when the resource is a PUCCH resource, pattern identifiers of corresponding patterns are a pattern identifier 1 to a pattern identifier 4 when the PUCCH resource includes two RBs, pattern identifiers of corresponding patterns are a pattern identifier 5 and a pattern identifier 6 when the PUCCH resource includes four RBs, and pattern identifiers of corresponding patterns are a pattern identifier 7 and a pattern identifier 8 when the PUCCH resource includes six RBs. When the pattern identifier in the resource configuration information is the pattern identifier 3, the terminal may determine, based on the pattern identifier 3, that the PUCCH resource includes two RBs. When the pattern identifier in the resource configuration information is the pattern identifier 7, the terminal may determine, based on the pattern identifier 3, that the PUCCH resource includes six RBs.

In one embodiment, the quantity of RBs included in the resource may be further in a correspondence with one or more the format of the control information corresponding to the resource, the payload type of the resource, the payload size of the control information corresponding to the resource, and the bandwidth of the frequency domain resource corresponding to the frequency domain resource identifier. For details, refer to the descriptions in the first possible implementation. Details are not described herein again.

In this embodiment of this application, the resource indicated by the resource configuration information is the PUCCH resource, and a pattern of the PUCCH resource may be determined based on a payload size of uplink control information transmitted by using the PUCCH resource. Specifically, a correspondence exists between the pattern and the payload size of the uplink control information transmitted by using the PUCCH resource. The access network device determines, as the pattern of the PUCCH resource, a pattern corresponding to the payload size of the uplink control information transmitted by using the PUCCH resource.

For example, when the payload size of the uplink control information transmitted by using the PUCCH resource is 2 bits to 20 bits, the payload size corresponds to a pattern 1; when the payload size of the uplink control information transmitted by using the PUCCH resource is 20 bits to 40 bits, the payload size corresponds to a pattern 2; and when the payload size of the uplink control information transmitted by using the PUCCH resource is 40 bits to 150 bits, the payload size corresponds to a pattern 3. When determining that the payload size of the uplink control information transmitted by using the PUCCH resource is 45 bits, the access network may determine that the pattern of the PUCCH resource is the pattern 3, to indicate a pattern identifier of the pattern 3 to the terminal.

For another example, the resource indicated by the resource configuration information is a PUCCH resource, both a pattern of the PUCCH resource and a quantity of RBs included in the PUCCH resource may be determined based on a payload size of uplink control information transmitted by using the PUCCH resource. Specifically, a correspondence exists between the payload size of the uplink control information transmitted by using the PUCCH resource and each of the quantity of RBs and the pattern. The access network device determines, as the pattern of the PUCCH resource, a pattern corresponding to the payload size of the uplink control information transmitted by using the PUCCH resource, and determines, as the quantity of RBs included in the PUCCH resource, a quantity of RBs corresponding to the payload size of the uplink control information transmitted by using the PUCCH resource.

For example, when the payload size of the uplink control information transmitted by using the PUCCH resource is 2 bits to 20 bits, the payload size corresponds to two RBs and the pattern 1; when the payload size of the uplink control information transmitted by using the PUCCH resource is 20 bits to 40 bits, the payload size corresponds to four RBs and the pattern 2; and when the payload size of the uplink control information transmitted by using the PUCCH resource is 40 bits to 150 bits, the payload size corresponds to six RBs and the pattern 3. When determining that the payload size of the uplink control information transmitted by using the PUCCH resource is 35 bits, the access network may determine that the pattern of the PUCCH resource is the pattern 3, and may determine that the PUCCH resource includes four RBs.

Certainly, the foregoing is merely an example, and another case is not described herein.

Similar to the first possible implementation, in the second possible implementation, the access network device may simultaneously configure a plurality of PUCCH resources (for example, indicate a plurality of PUCCH resources by using the resource configuration information). If the plurality of PUCCH resources are configured, the access network device may further indicate a resource by using the DCI. In this way, based on an indication in the DCI, the terminal can select at least one PUCCH resource from the plurality of PUCCH resources configured by the access network device, to transmit uplink control information.

For example, the access network device configures two PUCCH resources by using higher layer signaling such as RRC signaling or a MAC CE. The access network device may further use one bit in the DCI to indicate a PUCCH resource specifically used by the terminal. For example, a value 0 of the bit represents a first PUCCH resource; and a value 01 of the bit represents a second PUCCH resource.

Certainly, the foregoing is merely an example, and the access network device may alternatively perform indication in another manner. Details are not described herein.

Third Possible Implementation:

In this implementation, the access network device may configure a set of a segment of contiguous resources by using higher layer signaling, and then send resource configuration information to the terminal by using DCI. A PUCCH resource indicated by the resource configuration information is a part or all of a PUCCH resource set.

In one embodiment, the resource configuration information includes but is not limited to one or more of the following:

1. A resource allocation type (resource allocation type): The resource allocation type may be referred to as a resource indication manner.

2. A resource allocation type parameter corresponding to the resource allocation type: The resource allocation type parameter is a parameter used to indicate a resource.

3. A quantity of RBs included in the resource indicated by the resource configuration information.

4. A pattern identifier: A pattern indicated by the pattern identifier is a pattern of the resource indicated by the resource configuration information, and RBs in the resource may be contiguous or discrete.

In this embodiment of this application, the resource allocation type may include but is not limited to one or more of the following: a first type, indicating a resource by using an RBG bitmap, where reference may be made to the foregoing descriptions for details, and details are not described herein again; a second type, indicating a start RB of the resource and a quantity of included RBs; a third type, indicating a quantity of RBs included in the resource and/or a pattern of the resource, where reference may be made to the foregoing descriptions for details, and details are not described herein again; a fourth type: a resource allocation type 0; a fifth type: a resource allocation type 1; and a sixth type: a resource allocation type 2.

The resource allocation type 0, the resource allocation type 1, and the resource allocation type 2 may respectively refer to a resource allocation type 0, a resource allocation type 1, and a resource allocation type 2 in an LTE system. The resource allocation type 0 and the resource allocation type 1 may also respectively refer to a resource allocation type 0 and a resource allocation type 1 in an NR system. For example, the resource allocation type 0 in the LTE system is to indicate an allocated resource in a bitmap manner. Each bit in the bitmap corresponds to one RBG A value of a bit corresponding to an RBG included in the resource is 1, and a value of a bit corresponding to an RBG not included in the resource is 0. The resource allocation type 1 in the LTE system indicates that the access network device indicates a resource to the terminal by using three fields. A first field is used to indicate a selected RBG subset. A second field is used to indicate whether a resource in a subset is shifted. The third field includes one bitmap. Each bit in the bitmap corresponds to one virtual resource block (virtual resource block, VRB) in the selected RBG A value of a bit corresponding to a VRB included in the resource is 1 and a value of a bit corresponding to a VRB not included in the resource is 0. A mapping relationship exists between a VRB and a PRB. A PRB allocated to the terminal may be determined by using a VRB. The resource allocation type 2 in the LTE system is to indicate an allocated resource by indicating a start location and a length of a resource, and may indicate the start location and the length of the resource to the terminal by using a resource indication value (resource indication value, RIV). The resource allocation type 0 in the NR system is the same as the resource allocation type 0 in the LTE system, and details are not described herein again. The resource allocation type 1 in the NR system is the same as the resource allocation type 2 in the LTE system, and details are not described herein again.

For example, when the resource allocation type indicated by the resource configuration information is the first type, a resource allocation type parameter corresponding to the resource allocation type is at least one of a quantity of RBs included in an RBG and an RBG bitmap.

When the resource allocation type indicated by the resource configuration information is the second type, a resource allocation type parameter corresponding to the resource allocation type is at least one of the start RB of the resource and the quantity of included RBs.

When the resource allocation type indicated by the resource configuration information is the third type, a resource allocation type parameter corresponding to the resource allocation type is the quantity of RBs included in the resource and/or the pattern of the PUCCH resource.

In this embodiment of this application, a resource allocation type of the PUCCH resource may also be implicitly indicated. For example, the resource allocation type is a predefined resource allocation type, and the resource configuration information only needs to include the resource allocation type parameter.

For another example, a resource allocation type of a resource may be the same as a resource allocation type of data scheduling in data sent to the terminal. For example, the resource allocation type of the resource is the same as a resource allocation type of data scheduling in the DCI. When the resource allocation type of the data scheduling in the DCI sent to the terminal by the access network device is the fourth type, after determining that the resource allocation type of the data scheduling in the DCI is the fourth type, the terminal may determine that the resource allocation type of the resource allocated to the terminal by the access network device is also the fourth type, to determine, based on the fourth type, the resource allocated by the access network device.

The resource allocation type of the data scheduling in the DCI may be any one of the resource allocation type 0, the resource allocation type 1, and the resource allocation type 2 in the LTE system, or may be any one of the resource allocation type 0 and the resource allocation type 1 in the NR system.

It should be noted that in this implementation, when the resource configuration information includes at least one of the quantity of RBs included in the PUCCH resource and the pattern identifier, reference may be made to the foregoing descriptions for how the access network device determines the quantity of RBs included in the PUCCH resource and the pattern identifier. Details are not described herein again.

It should be noted that reference may be made to the descriptions in the prior art for a specific implementation of the resource allocation type 0, the resource allocation type 1, and the resource allocation type 2 in the LTE system. Details are not described herein.

In operation 203 and operation 204, after receiving the resource configuration information from the access network device, the terminal may transmit the control information in the resource indicated by the resource configuration information. For example, when the resource indicated by the resource configuration information is a PUCCH resource, the terminal may send information such as uplink control information by using the PUCCH resource indicated by the resource configuration information.

The foregoing implementations may be implemented independently or may be combined with another implementation. This is not limited in this embodiment of this application. In addition, in some cases, some possible implementations in this embodiment of this application may be decoupled from another part, to achieve a corresponding technical objective and effect.

When the access network device simultaneously configures at least two resources, the access network device may indicate a time domain offset and/or a frequency domain offset between the two resources, to reduce indication overheads of resource allocation and improve system performance. An example in which the access network device simultaneously configures two resources is used for description below. For a case in which the access network device simultaneously configures more than two resources, refer to the following descriptions. Details are not described herein.

The access network device simultaneously configures a first resource and a second resource. A PUCCH corresponding to the first resource is a short PUCCH, and a PUCCH corresponding to the second resource is a long PUCCH. Alternatively, a PUCCH corresponding to the first resource is a long PUCCH, and a PUCCH corresponding to the second resource is a short PUCCH. Alternatively, both a PUCCH corresponding to the first resource and a PUCCH corresponding to the second resource are short PUCCHs. Alternatively, both a PUCCH corresponding to the first resource and a PUCCH corresponding to the second resource are long PUCCHs. Alternatively, another combination may be used. Specifically, this is not limited herein.

Figure 6:
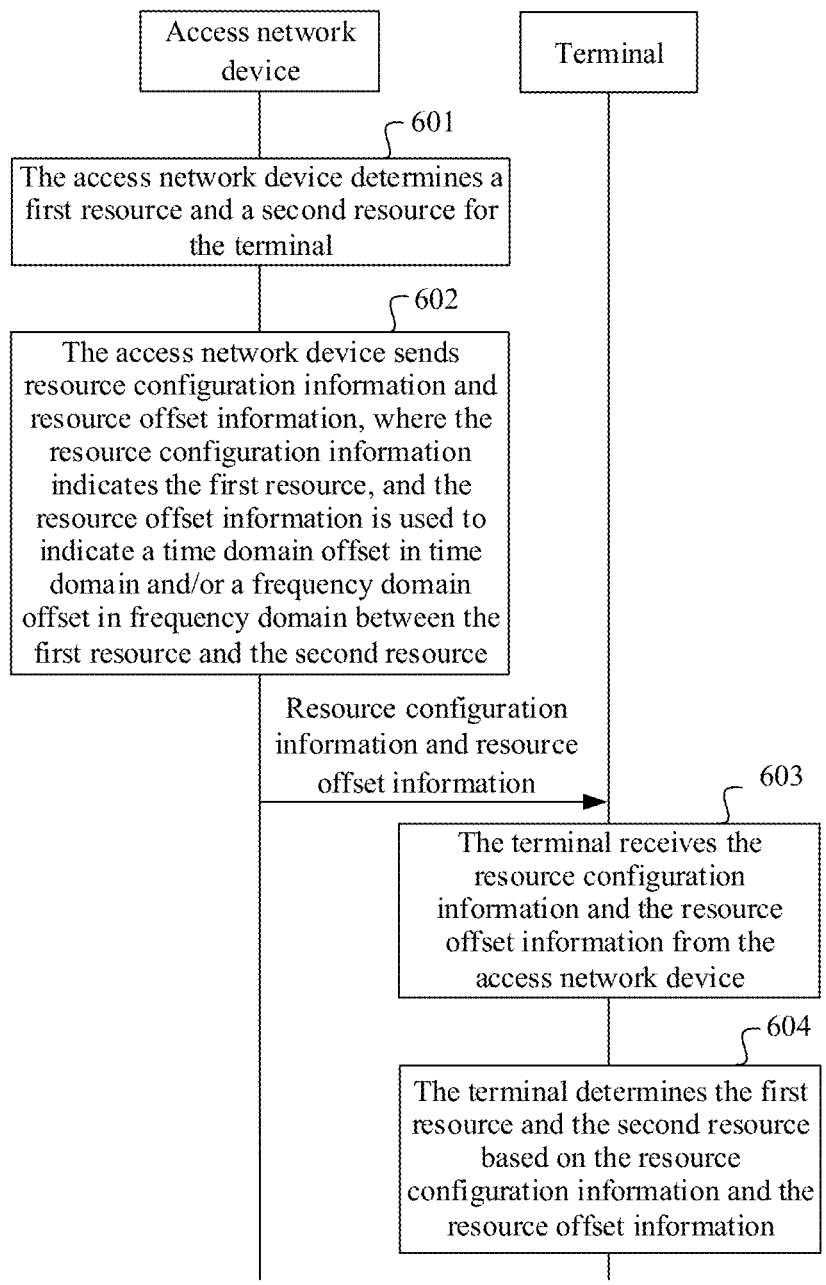
FIG. 6 is a schematic flowchart of a communication method according to an embodiment of this application.

Specifically, FIG. 6 is a schematic flowchart of a communication method according to an embodiment of this application.

Operation 601: An access network device determines a first resource and a second resource for a terminal.

Operation 602: The access network device sends resource configuration information and resource offset information, where the resource configuration information indicates the first resource, and the resource offset information is used to indicate a time domain offset and/or a frequency domain offset between the first resource and the second resource.

Operation 603: The terminal receives the resource configuration information and the resource offset information from the access network device, where the resource configuration information is used to indicate the first resource, and the resource offset information is used to indicate the time domain offset and/or the frequency domain offset between the first resource and the second resource.

Operation 604: The terminal determines the first resource and the second resource based on the resource configuration information and the resource offset information.

For specific content of the resource configuration information and a method of determining, refer to the foregoing descriptions in any possible implementations. Details are not described herein again.

In this embodiment of this application, in a possible implementation, the resource offset information indicates one or more of the following:

a quantity of RBs between a first RB of the first resource and a second RB of the second resource, where the first RB may be at least one of a start RB of the first resource, an end RB of the first resource, and the like, and the second RB may be at least one of a start RB of the second resource, an end RB of the second resource, and the like; and a quantity of symbols between a first symbol of the first resource and a second symbol of the second resource, where the first symbol may be at least one of a start symbol of the first resource, an end symbol of the first resource, and the like, and the second symbol may be at least one of a start symbol of the second resource, an end symbol of the second resource, and the like.

In one embodiment, when the resource offset information indicates one of the items, the other item may be predefined. For example, when the resource offset information indicates the quantity of symbols between the first symbol of the first resource and the second symbol of the second resource, the quantity of RBs between the first RB of the first resource and the second RB of the second resource may be a preset quantity of RBs. Correspondingly, when the resource offset information indicates the quantity of RBs between the first RB of the first resource and the second RB of the second resource, the quantity of symbols between the first symbol of the first resource and the second symbol of the second resource may also be a preset quantity of symbols.

In this implementation, after determining the first resource based on the resource configuration information, the terminal further determines, based on the resource offset information, at least one of the quantity of RBs between the first RB of the first resource and the second RB of the second resource and the quantity of symbols between the first symbol of the first resource and the second symbol of the second resource. In this way, an offset location of the second resource relative to the first resource may be determined, so that the second resource can be determined. It should be noted that, when the terminal determines, based on the resource offset information, one of the quantity of RBs between the first RB of the first resource and the second RB of the second resource and the quantity of symbols between the first symbol of the first resource and the second symbol of the second resource, the other item is predefined or determined in another manner. Therefore, it may be considered that the terminal has determined the other item.

In one embodiment, the resource offset information may further indicate a quantity of RBs included in a second PUCCH resource and/or a quantity of symbols occupied by the second PUCCH resource. Certainly, the quantity of RBs included in the second PUCCH resource may also be preset, or may be indicated in another manner. Correspondingly, the quantity of symbols occupied by the second PUCCH resource may also be preset, or may be indicated in another manner.

Details are not described herein.

Resource offset information in different scenarios is described below with reference to the accompanying drawings. The following embodiments may be used as independent embodiments, or may be mutually combined. Specifically, this is not limited herein.

In a first scenario, both the first resource and the second resource are PUCCH resources. An example in which a PUCCH corresponding to the first resource is a short PUCCH, and a PUCCH corresponding to the second resource is a long PUCCH is used for description.

In one embodiment, the access network device indicates, by using the resource configuration information, the start RB of the first resource and a quantity of RBs included in the first resource.

In one embodiment, the quantity of RBs between the start RB of the first resource and the start RB of the second resource is indicated by using the resource offset information.

Figure 7:
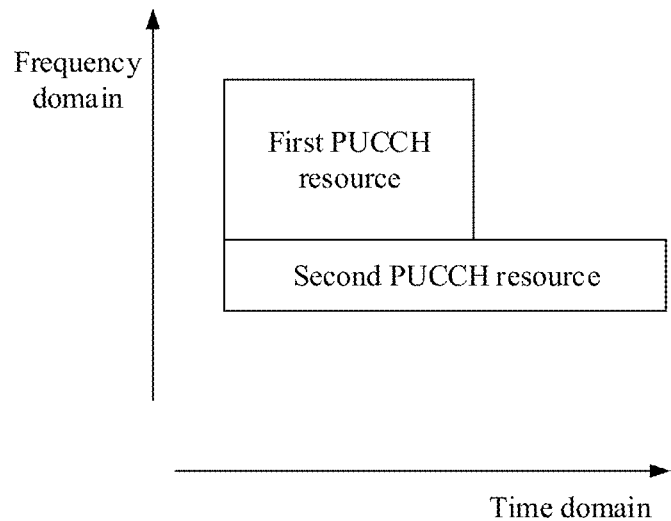
FIG. 7 is a schematic diagram of resource offset according to an embodiment of this application.

For example, the resource configuration information indicates the start RB of the first resource, and indicates that the quantity of RBs included in the first resource is P, where P is an integer greater than 0. The resource offset information indicates the quantity of RBs between the start RB of the first resource and the start RB of the second resource. For example, the quantity may be P1, where P1 is an integer greater than or equal to 0. For example, when P1 is equal to P, in this case, it may be considered that the second resource is adjacent to the first resource in frequency domain. Details may be shown in FIG. 7.

Certainly, the quantity of RBs between the start RB of the first resource and the start RB of the second resource may alternatively be another value. For example, the quantity may be a preset value. Details are not described herein.

In one embodiment, the resource offset information may indicate a quantity of RBs between the end RB of the first resource and the start RB of the second resource. For example, the quantity may be P2. In one embodiment, when P2 is 0, it may be considered that the second resource is adjacent to the first resource in frequency domain. Details may be shown in FIG. 7.

In one embodiment, a quantity of RBs included in the second resource may be predefined, or may be the same as the quantity of RBs included in the first resource. Alternatively, the quantity of RBs included in the second resource may be indicated by using signaling. The signaling may be resource frequency domain information, or may be other signaling. Specifically, this is not limited herein.

In one embodiment, the resource offset information may indicate a spacing between the first RB of the first resource and the second RB of the second resource, and further may indicate the quantity of RBs included in the second resource.

In one embodiment, in time domain, the access network device indicates, by using the resource configuration information, the start symbol of the first resource and a quantity of symbols occupied by the first resource.

In one embodiment, a quantity of symbols between the start symbol of the first resource and the start symbol of the second resource is indicated by using the resource offset information.

Figure 8:
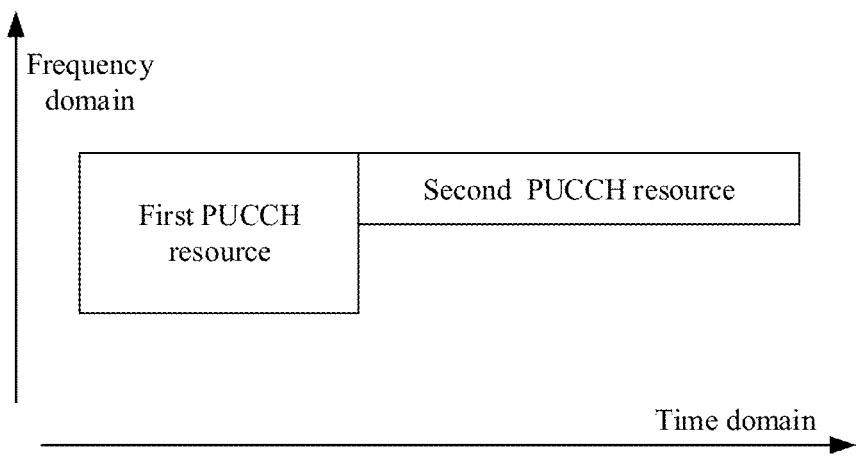
FIG. 8 is a schematic diagram of resource offset according to an embodiment of this application.

For example, the resource configuration information indicates the start symbol of the first resource, and indicates the quantity of symbols occupied by the first resource. For example, the quantity may be M, where M is an integer greater than or equal to 0. The resource offset information indicates the quantity of symbols between the start symbol of the first resource and the start symbol of the second resource. For example, the quantity may be M1, where M1 is an integer greater than or equal to 0. For example, when M1 is equal to M, in this case, it may be considered that the second resource is adjacent to the first resource in time domain. Details may be shown in FIG. 8.

In one embodiment, the resource offset information may indicate a quantity of RBs between the end symbol of the first resource and the start symbol of the second resource, for example, the quantity may be M2. In one embodiment, M2 is 0, and it may be considered that the second resource is adjacent to the first resource in time domain. Details may be shown in FIG. 8.

Certainly, the quantity of symbols between the start symbol of the first resource and the start symbol of the second resource may alternatively be another value. For example, the quantity may be a preset value. Details are not described herein.

In one embodiment, a quantity of symbols included in the second resource may be predefined, or may be the same as the quantity of symbols included in the first resource. Alternatively, the quantity of symbols included in the second resource may be indicated by using signaling. The signaling may be resource frequency domain information, or may be other signaling. Specifically, this is not limited herein.

In one embodiment, the resource offset information may indicate a spacing between the first symbol of the first resource and the second symbol of the second resource, and further may indicate the quantity of symbols included in the second resource.

It should be noted that, when the resource offset information indicates other content, reference may be made to the descriptions herein. This is not described herein by using examples one by one.

In a second scenario, both the first resource and the second resource are PUCCH resources. An example in which a PUCCH corresponding to the first resource is a long PUCCH, and a PUCCH corresponding to the second resource is a short PUCCH is used for description. This may be similar to the foregoing case. For details, refer to FIG. 9 and FIG. 10.

In one embodiment, the access network device indicates, by using the resource configuration information, a start RB of the first resource and a quantity of RBs included in the first resource.

In one embodiment, a quantity of RBs between the start RB of the first resource and a start RB of the second resource is indicated by using the resource offset information.

Figure 9:
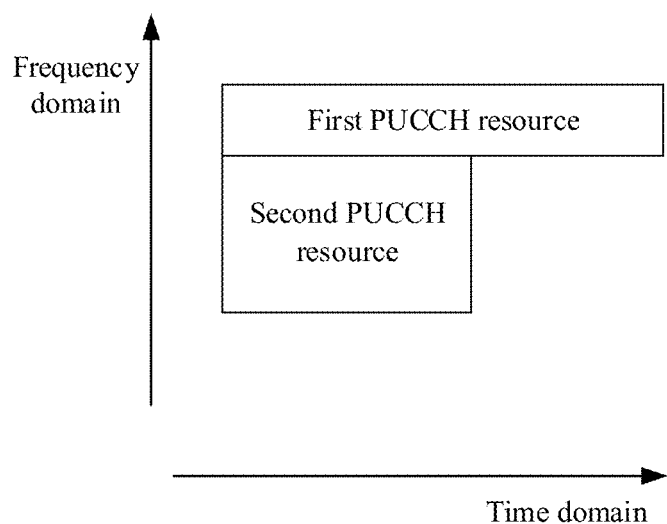
FIG. 9 is a schematic diagram of resource offset according to an embodiment of this application.
Figure 10:
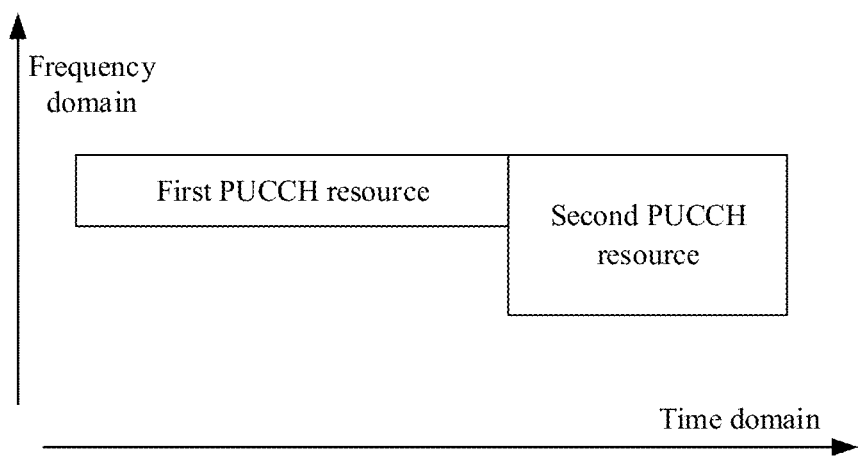
FIG. 10 is a schematic diagram of resource offset according to an embodiment of this application.

In FIG. 9, the resource configuration information indicates the start RB of the first resource, and indicates that the quantity of RBs included in the first resource is K, where K is an integer greater than 0. The resource offset information indicates the quantity of RBs between the start RB of the first resource and the start RB of the second resource. For example, the quantity may be K1, where K1 is an integer greater than or equal to 0. For example, when K1 is equal to K, in this case, it may be considered that the second resource is adjacent to the first resource in frequency domain.

Certainly, the quantity of RBs between the start RB of the first resource and the start RB of the second resource may alternatively be another value. For example, the quantity may be a preset value. Details are not described herein.

In one embodiment, a quantity of RBs included in the second resource may be predefined, or may be the same as the quantity of RBs included in the first resource. Alternatively, the quantity of RBs included in the second resource may be indicated by using signaling. The signaling may be resource frequency domain information, or may be other signaling. Specifically, this is not limited herein.

In one embodiment, the resource offset information may indicate a spacing between a first RB of the first resource and a second RB of the second resource, and indicates the quantity of RBs included in the second resource at the same time.

In one embodiment, the resource offset information may indicate a quantity of RBs between an end RB of the first resource and the start RB of the second resource. For example, the quantity may be K2. In one embodiment, when K2 is 0, it may be considered that the second resource is adjacent to the first resource in frequency domain. Details may be shown in FIG. 9.

In one embodiment, correspondingly, in time domain, the access network device indicates, by using the resource configuration information, a start symbol of the first resource and a quantity of symbols occupied by the first resource.

In one embodiment, a quantity of symbols between the start symbol of the first resource and a start symbol of the second resource is indicated by using the resource offset information. In FIG. 9, the resource configuration information indicates the start symbol of the first resource, and indicates that the quantity of symbols occupied by the first resource is Q, where Q is an integer greater than 0. The resource offset information indicates the quantity of symbols between the start symbol of the first resource and the start symbol of the second resource. For example, the quantity may be Q1, where Q1 is an integer greater than or equal to 0. For example, when Q1 is equal to Q, in this case, it may be considered that the second resource is adjacent to the first resource in time domain.

In one embodiment, the resource offset information may indicate a quantity of RBs between an end symbol of the first resource and the start symbol of the second resource. For example, the quantity may be Q2. In one embodiment, Q2 is 0, and it may be considered that the second resource is adjacent to the first resource in time domain. Details may be shown in FIG. 9.

Certainly, the quantity of symbols between the start symbol of the first resource and the start symbol of the second resource may alternatively be another value. For example, the quantity may be a preset value. Details are not described herein.

In one embodiment, a quantity of symbols included in the second resource may be predefined, or may be the same as the quantity of symbols included in the first resource. Alternatively, the quantity of symbols included in the second resource may be indicated by using signaling. The signaling may be resource frequency domain information, or may be other signaling. Specifically, this is not limited herein.

In one embodiment, the resource offset information may indicate a spacing between the first symbol of the first resource and the second symbol of the second resource, and further may indicate the quantity of symbols included in the second resource.

It should be noted that reference may be made to the descriptions herein when the resource offset information indicates other content. This is not described herein by using examples one by one.

In another possible implementation, the resource offset information indicates a quantity of overlapping time domain symbols and/or a quantity of overlapping frequency domain RBs between the first resource and the second resource. In this implementation, an RB occupied by the second resource in frequency domain is a part or all of an RB occupied by the first resource in frequency domain. A quantity of RBs occupied by the second resource in frequency domain is a quantity of RBs indicated by the resource offset information. According to a first preset rule, the RB occupied by the second resource in frequency domain may be intercepted from the RB occupied by the first resource in frequency domain.

Correspondingly, a symbol occupied by the second resource in time domain is a part or all of the symbol occupied by the first resource in time domain. A quantity of symbols occupied by the second resource in time domain is a quantity of symbols indicated by the resource offset information. According to a second preset rule, the symbol occupied by the second resource in time domain may be intercepted from the symbol occupied by the first resource in time domain. Detailed descriptions are provided below.

It should be noted that in this embodiment of this application, when the resource offset information indicates one of the quantity of overlapping time domain symbols and the quantity of overlapping frequency domain RBs between the first resource and the second resource, the other item may be predefined, or may be indicated in another manner. Details are not described herein. For example, the quantity of RBs included in the second resource may be predefined, or may be indicated in another manner. Details are not described herein. For another example, the quantity of symbols occupied by the second resource may be predefined, or may be indicated in another manner. Details are not described herein.

In a third scenario, both the first resource and the second resource are PUCCH resources. An example in which a PUCCH corresponding to the first resource is a short PUCCH and a PUCCH corresponding to the second resource is a long PUCCH is used for description. The first resource overlaps with the second resource in frequency domain. An RB occupied by the second resource in frequency domain is a part or all of an RB occupied by the first resource in frequency domain.

In one embodiment, the access network device indicates, by using the resource configuration information, a start RB of the first resource and a quantity of RBs included in the first resource.

Figure 11:
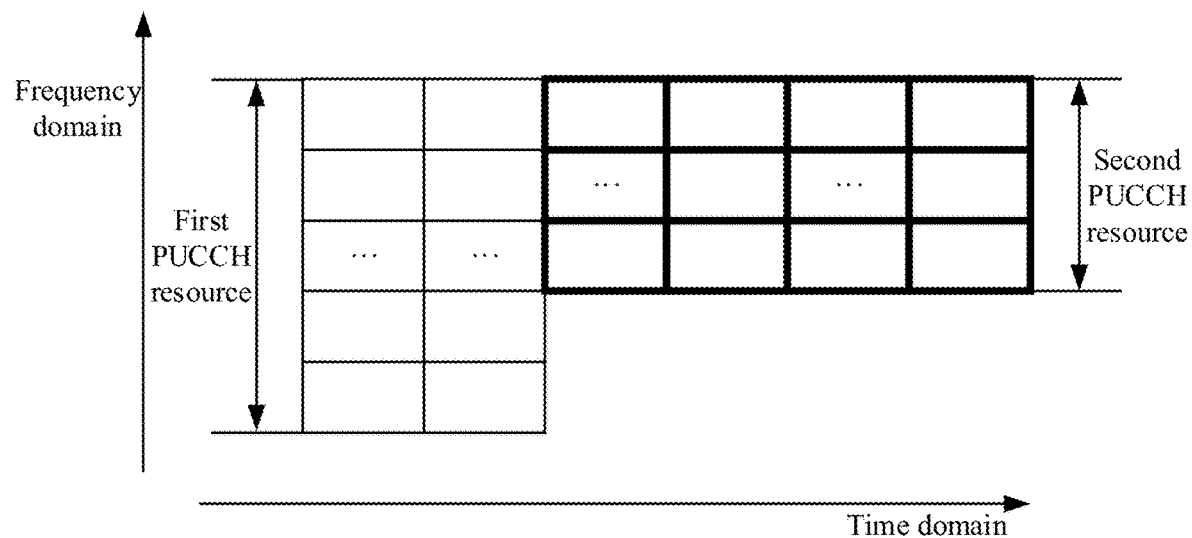
FIG. 11 is a schematic diagram of resource offset according to an embodiment of this application.

In this scenario, the first preset rule may be as follows: RBs occupied by the second resource may be L1 RBs intercepted upward or downward from the start RB in the RBs occupied by the first resource, or L2 RBs intercepted downward or upward from an end RB in the RBs included in the first resource. Herein, L1 or L2 is a quantity of RBs occupied by the second resource, and L1 or L2 is an integer greater than 0. For example, as shown in FIG. 11, the RBs occupied by the second resource are L3 RBs intercepted downward from the end RB in the RBs occupied by the first resource.

In one embodiment, a start RB may be an RB with a smallest RB number in a resource, and an end RB may be an RB with a largest RB number in the resource.

Intercepting L1 RBs upward from the start RB in the RBs occupied by the first resource may be using the start RB in the RBs occupied by the first resource to an RB whose number is a number of the start RB plus L1-1 as intercepted RBs.

Intercepting L1 RBs downward from the start RB in the RBs occupied by the first resource may be using the start RB in the RBs occupied by the first resource to an RB whose number is the number of the start RB minus L1-1 as intercepted RBs.

Intercepting L2 RBs upward from the end RB in the RBs occupied by the first resource may be using the end RB in the RBs occupied by the first resource to an RB whose number is a number of the end RB plus L2-1 as intercepted RBs.

Intercepting L2 RBs downward from the end RB in the RBs occupied by the first resource may be using the end RB in the RBs occupied by the first resource to an RB whose number is the number of the end RB minus L2-1 as intercepted RBs.

In one embodiment, the first preset rule may be predefined in a protocol or notified by using first signaling. Specifically, this is not limited herein. The first preset rule may further have another implementation. This is not described again herein by using examples one by one.

In one embodiment, a quantity of RBs included in the second resource may be predefined or notified by using second signaling. Specifically, this is not limited herein. In one embodiment, the first signaling and the second signaling may be the same signaling, or may be different signaling. Specifically, this is not limited herein.

In a fourth scenario, both the first resource and the second resource are PUCCH resources. An example in which a PUCCH corresponding to the first resource is a long PUCCH and a PUCCH corresponding to the second resource is a short PUCCH is used for description. The first resource overlaps with the second resource in time domain. In other words, symbols occupied by the first resource and symbols occupied by the second resource are partially the same.

In one embodiment, the access network device indicates, by using the resource configuration information, a start symbol of the first resource and a quantity of symbols occupied by the first resource.

In one embodiment, a quantity of symbols occupied by the second resource is indicated by using the resource offset information.

Figure 12:
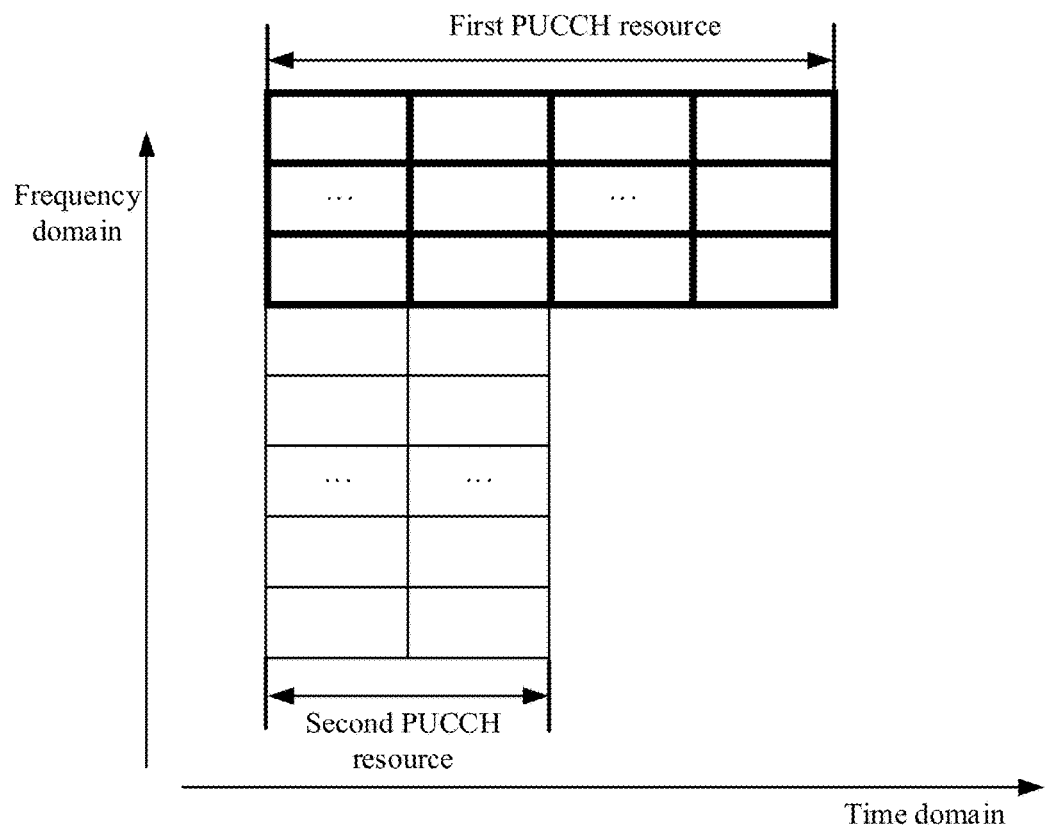
FIG. 12 is a schematic diagram of resource offset according to an embodiment of this application.

In this case, a symbol occupied by the second resource may be a part or all of the symbols occupied by the first resource. The second preset rule may be as follows: Symbols occupied by the second resource may be H1 symbols intercepted backward or forward from the start symbol in the symbols occupied by the first resource, or H2 symbols intercepted forward or backward from an end symbol in the symbols occupied by the first resource. Herein, H1 or H2 is a quantity of symbols occupied by the second resource, and H1 or H2 is an integer greater than 0. For example, as shown in FIG. 12, the symbols included in the second resource are H symbols intercepted backward from the start symbol in the symbols occupied by the first resource.

In one embodiment, a start symbol may be a symbol with a smallest symbol number in a resource, and an end symbol may be a symbol with a largest symbol number in the resource.

Intercepting H1 symbols backward from the start symbol in the symbols occupied by the first resource may be using the start symbol in the symbols occupied by the first resource to a symbol whose number is a number of the start symbol plus H1-1 as intercepted symbols.

Intercepting H1 symbols forward from the start symbol in the symbols occupied by the first resource may be using the start symbol in the symbols occupied by the first resource to a symbol whose number is a number of the start symbol minus H1-1 as intercepted symbols.

Intercepting H2 symbols backward from the end symbol in the symbols occupied by the first resource may be using the end symbol in the symbols occupied by the first resource to a symbol whose number is a number of the end symbol plus H2-1 as intercepted symbols.

Intercepting H2 symbols forward from the end symbol in the symbols occupied by the first resource may be using the end symbol in the symbols occupied by the first resource to a symbol whose number is a number of the end symbol minus H2-1 as intercepted symbols.

In one embodiment, the second preset rule may be predefined in a protocol or notified by using first signaling. Specifically, this is not limited herein. The second preset rule may further have another implementation. This is not described herein by using examples one by one.

In one embodiment, a quantity of symbols included in the second resource may be predefined or notified by using second signaling. Specifically, this is not limited herein. In one embodiment, the first signaling and the second signaling may be the same signaling, or may be different signaling. Specifically, this is not limited herein.

In one embodiment, in this embodiment of this application, different PUCCH configuration parameters may be configured for different transmission/reception points (Transmission Receiver Point, TRP), and a PUCCH configuration parameter includes a time-frequency location and/or a sequence location.

In one embodiment, different PUCCH formats may be used for different TRPs. For example, a short PUCCH is used for a TRP 1, and a long PUCCH is used for a TRP 2. A corresponding configuration method may be at least one of the following three methods.

Method 1: Configure a plurality of PUCCH resources (for example, indication (also referred to as configuration) is performed by using resource configuration information).

A plurality of groups of PUCCH resources are configured for each BWP, so that different TRPs receive uplink data by using different PUCCHs of a same BWP. There are two corresponding designs.

Method 1.1: Allocate a PUCCH resource in a BWP.

In one embodiment, a BWP identifier may be configured in the PUCCH resource.

Configuration of one or more PUCCH resources may be supported in one BWP.

Therefore, a BWP identifier may be configured in each corresponding PUCCH resource, to indicate, by using a BWP identifier, a BWP in which a PUCCH resource is located.

In one embodiment, further, when frequency domain information of a PUCCH resource is indicated, a location of an RB included in the PUCCH resource in a BWP may be further indicated.

A specific method is as follows:

A BWP identifier is configured in each PUCCH resource. In this case, the terminal determines, based on a BWP activated by the terminal, a PUCCH resource available to a current BWP, so that different TRPs receive uplink data by using different PUCCH resources of a same BWP.

In one embodiment, each BWP identifier may correspond to information about a frame structure. The information about the frame structure includes at least one of a subcarrier spacing, a cyclic prefix (cyclic prefix, CP) length, a subframe type, and a slot type. Information about a frame structure corresponding to a PUCCH resource may be determined based on a BWP identifier in the PUCCH resource.

In one embodiment, for a PUCCH resource, information about a frame structure corresponding to the resource may be indicated (for example, indicated by using resource configuration information). In this case, information about a frame structure corresponding to a corresponding PUCCH resource may be determined based on the indicated information about the frame structure.

Method 1.2: Allocate a PUCCH resource in an entire bandwidth.

In this method, an RB allocated in the PUCCH resource is an RB selected in the entire bandwidth.

In one embodiment, information about a frame structure may be indicated during resource configuration (for example, indicated by using resource configuration information), and information about a frame structure corresponding to a PUCCH resource may be determined based on the indicated information about the frame structure.

Information about a frame structure includes at least one of a subcarrier spacing, a CP length, a subframe type, or a slot type.

In one embodiment, the subframe type may be referred to as an uplink subframe, a downlink subframe, and a subframe with both an uplink symbol and a downlink symbol. Alternatively, the subframe type may be determined based on a quantity of symbols included in a subframe. For example, different subframe types correspond to different quantities of uplink symbols and/or downlink symbols.

In one embodiment, the slot type may be determined based on a quantity of symbols included in a slot. In one embodiment, different quantities of symbols in a slot may correspond to different slot types.

The subframe and the slot are merely examples, and the subframe and/or the slot may be a time unit. For example, the time unit may be at least one of a radio frame, a subframe, a slot, a mini-slot, and a symbol, or another time unit for measuring time. Specifically, this is not limited herein.

In one embodiment, whether resource configuration of a PUCCH resource is indicated in a resource location in a BWP or a resource location in the entire bandwidth may be predefined by using a protocol, or may be determined by using information configured by an access network device.

Specifically, according to a communication method for determining a PUCCH resource by using the information configured by the access network device, the information configured by the access network device may be information used to indicate the method 1.1 and the method 1.2.

In one embodiment, the method 1.1 or the method 1.2 may be determined based on whether a BWP identifier is configured. For example, if the BWP identifier is configured, the method 1.1 may be determined. In other words, it is determined that the resource configuration of the PUCCH resource is indicated in the BWP. If the BWP identifier is not configured, the method 1.2 may be determined. In other words, it is determined that the resource configuration of the PUCCH resource is indicated in the entire bandwidth.

In one embodiment, the method 1.1 or the method 1.2 may be determined based on whether information about a frame structure is configured. For example, if the information about the frame structure is configured, the method 1.1 may be determined. In other words, it is determined that the resource configuration of the PUCCH resource is indicated in the BWP. If the information about the frame structure is not configured, the method 1.2 may be determined. In other words, it is determined that the resource configuration of the PUCCH resource is indicated in the entire bandwidth.

In one embodiment, the method 1.1 or the method 1.2 may be determined based on whether the BWP identifier and the information about the frame structure are configured. For example, if the BWP identifier is not configured and the information about the frame structure is configured, the method 1.2 is determined. In other words, it is determined that the resource configuration of the PUCCH resource is indicated in the entire bandwidth. In another case, the method 1.1 is determined. In other words, it is determined that the resource configuration of the PUCCH resource is indicated in the BWP.

In one embodiment, the method 1.1 or the method 1.2 may alternatively be determined in another manner. Specifically, this is not limited herein.

Method 2: Configure a PUCCH resource for a PUCCH format.

In one embodiment, one or more groups of PUCCH resources may be configured for each PUCCH format. A group of PUCCH resources includes one or more PUCCH resources.

In one embodiment, different PUCCH formats may correspond to different groups of PUCCH resources. In other words, a plurality of groups of PUCCH resources are configured for different PUCCH formats.

For example, because different PUCCH formats (a type of control information carried in a PUCCH resource) correspond to different bearer information, resource configuration may be performed based on bearer information corresponding to different PUCCH formats. For example, when bearer information corresponding to a PUCCH format is ACK/NACK, a PUCCH resource group 1 is configured; or when the bearer information corresponding to the PUCCH format is CSI, a PUCCH resource group 2 is configured.

Specifically, when a PUCCH format corresponding to a PUCCH resource is determined, when indicating the PUCCH resource, the access network device may indicate one or more PUCCH resources in a group of PUCCH resources corresponding to the PUCCH format. For example, the access network device configures four PUCCH resources, a PUCCH format 1 corresponds to a group of PUCCH resources such as a resource 0 and a resource 1, and a PUCCH format 2 corresponds to another group of PUCCH resources such as a resource 2 and a resource 3. In this case, the access network device may indicate a PUCCH resource by using one bit. For example, if the PUCCH format 1 is determined currently, it may be determined that the PUCCH resource is one of the two PUCCH resources corresponding to the PUCCH format 1; or if the PUCCH format 2 is determined currently, it may be determined that the PUCCH resource is one of the two PUCCH resources corresponding to the PUCCH format 2.

In one embodiment, when a resource is numbered, different PUCCH formats may correspond to same numbers. Specifically, for example, numbers of the PUCCH resources corresponding to the PUCCH format 1 are 0 and 1, and numbers of the PUCCH resources corresponding to the PUCCH format 2 may also be 0 and 1. However, PUCCH resources corresponding to same numbers are different. When performing indication, the access network device indicates a PUCCH resource for a PUCCH format. Compared with a uniform indication (for example, a PUCCH resource identifier is not numbered by using a PUCCH format as a dimension), this can reduce signaling overheads.

In this embodiment of this application, a correspondence between a PUCCH format and a PUCCH resource group may be notified to the terminal by the access network device, or may be predefined in a protocol. Specifically, this is not limited herein.

In this embodiment of this application, the correspondence between a PUCCH format and a PUCCH resource group is merely an example. Another correspondence may alternatively be used. Specifically, this is not limited herein.

Method 3: Configure a PUCCH resource for a PUCCH payload type and/or a payload size.

In one embodiment, a plurality of groups of PUCCH resources may be configured for different PUCCH payload types and/or payload sizes. In other words, configuration of a plurality of groups of PUCCH resources may be performed for different PUCCH payload types and/or payload sizes.

For example, different PUCCH payload types and/or payload sizes correspond to different bearer information. Therefore, resource configuration may be performed based on bearer information corresponding to different PUCCH payload types and/or payload sizes. For example, a specific method is as follows: A PUCCH resource group 1 is configured for a PUCCH resource of a payload type 1, and a PUCCH resource group 2 is configured for a PUCCH resource of a payload type 2.

For example, the PUCCH resource group 1 is configured for PUCCH resources whose payload sizes are 1 bit to 20 bits; and the PUCCH resource group 2 is configured for PUCCH resources whose payload sizes are 21 bits to 40 bits.

In this embodiment of this application, a value of a payload type and a value of a payload size are merely examples, and another value may alternatively be used. Specifically, this is not limited herein.

Specifically, when a payload type and/or a payload size corresponding to a PUCCH resource are/is determined, the access network device may indicate one or more PUCCH resources in a group of PUCCH resources corresponding to the payload type and/or the payload size when indicating the PUCCH resource. For example, the access network device configures four PUCCH resources; the payload type 1 and/or a payload size 1 correspond/corresponds to a group of PUCCH resources, for example, a resource 0 and a resource 1; and the payload type 2 and/or a payload size 2 correspond/corresponds to another group of PUCCH resources, for example, a resource 2 and a resource 3. In this case, the access network device may indicate a PUCCH resource by using one bit. For example, if the payload type 1 and/or the payload size 1 are/is determined currently, it may be determined that the PUCCH resource is one of the two PUCCH resources corresponding to the payload type 1 and/or the payload size 1; or if the payload type 2 and/or the payload size 2 are/is determined currently, it may be determined that the PUCCH resource is one of the two PUCCH resources corresponding to the payload type 2 and/or the payload size 2.

In one embodiment, when a resource is numbered, different payload types and/or payload sizes may correspond to same numbers. Specifically, for example, numbers of the PUCCH resources corresponding to the payload type 1 and/or the payload size 1 are 0 and 1, and numbers of the PUCCH resources corresponding to the payload type 2 and/or the payload size 2 may also be 0 and 1. However, PUCCH resources corresponding to same numbers are different. When performing indication, the access network device indicates a PUCCH resource for a payload type and/or a payload size. Compared with a uniform indication (for example, a PUCCH resource identifier is not numbered by using a payload type and/or a payload size as a dimension), this can reduce signaling overheads.

In this embodiment of this application, a correspondence between a payload type and/or a payload size and a PUCCH resource group may be notified to the terminal by the access network device, or may be predefined in a protocol. Specifically, this is not limited herein.

In this embodiment of this application, the correspondence between a payload type and/or a payload size and a PUCCH resource group is merely an example. Another correspondence may alternatively be used. Specifically, this is not limited herein.

The foregoing implementations may be implemented independently or may be combined with another implementation. This is not limited in this embodiment of this application. In addition, in some cases, some possible implementations in this embodiment of this application may be decoupled from another part, to achieve a corresponding technical objective and effect.

The foregoing describes in detail the communication method in the embodiments of this application with reference to the accompanying drawings, and the following describes in detail a communications apparatus in the embodiments of this application with reference to the accompanying drawings.

Figure 13:
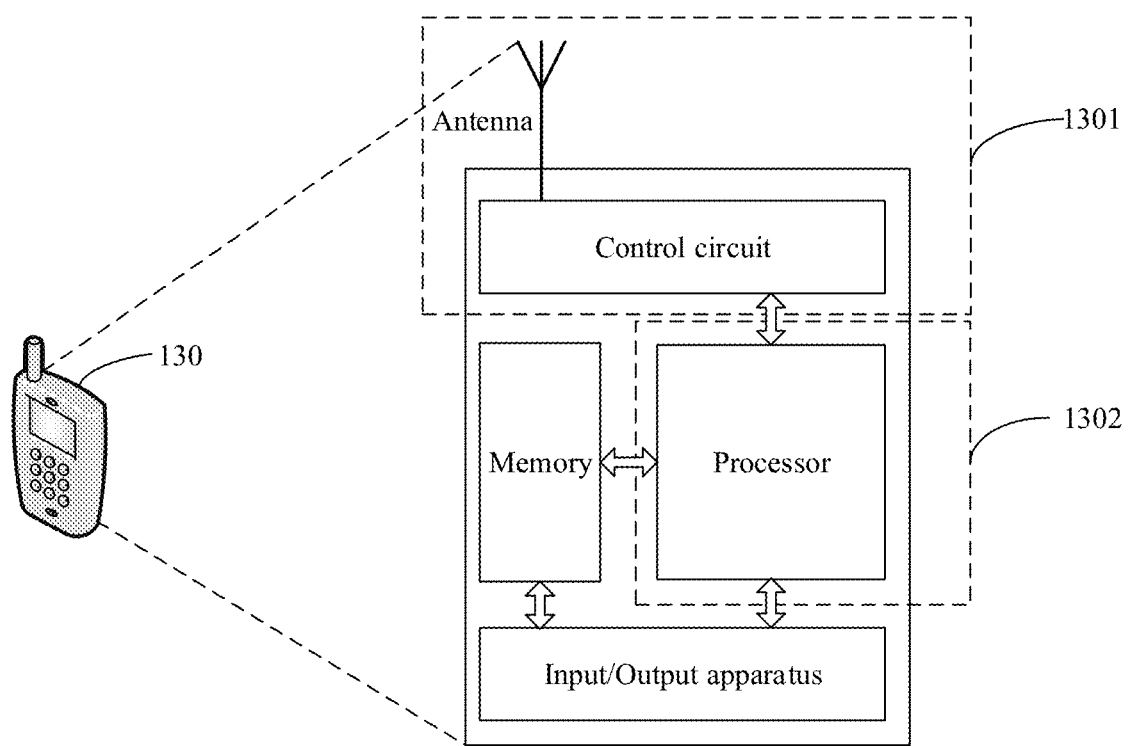
FIG. 13 is a schematic structural diagram of a terminal according to an embodiment of this application.

FIG. 13 is a schematic structural diagram of a terminal according to an embodiment of this application. The terminal is applicable to the flowchart shown in FIG. 2 or FIG. 6, and performs functions of the terminal in the foregoing method embodiments. For ease of description, FIG. 13 shows only main components of the terminal. As shown in FIG. 13, the terminal 130 includes a processor, a memory, a control circuit, an antenna, and an input/output apparatus. The processor is mainly configured to: process a communications protocol and communication data, control the entire terminal, execute a software program, and process data of the software program. For example, the processor is configured to support the terminal in performing the actions described in the foregoing method embodiments. For example, the processor receives resource configuration information from an access network device, and transmits control information by using a resource indicated by the resource configuration information. The memory is mainly configured to store a software program and data. For example, the memory stores the resource configuration information described in the foregoing embodiment. The control circuit is mainly configured to perform conversion between a baseband signal and a radio frequency signal and process the radio frequency signal. The control circuit, together with the antenna, may also be referred to as a transceiver that is mainly configured to receive and send a radio frequency signal in an electromagnetic wave form. The input/output apparatus such as a touchscreen, a display screen, or a keyboard is mainly configured to receive data entered by a user and output data to the user.

After the terminal is powered on, the processor may read the software program in a storage unit, interpret and execute an instruction of the software program, and process the data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 13 shows only one memory and only one processor. Actually, the terminal may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire terminal, execute the software program, and process the data of the software program. The processor in FIG. 13 may include functions of the baseband processor and/or the central processing unit. A person skilled in the art may understand that the baseband processor and the central processing unit may be alternatively processors independent of each other, and are interconnected by using a technology such as a bus. A person skilled in the art may understand that the terminal may include one or more baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing a communications protocol and communication data may be embedded into the processor, or may be stored in a storage unit in a form of a software program, so that the processor executes the software program to implement a baseband processing function.

In this embodiment of this application, the antenna that has receiving and sending functions and the control circuit may be considered as a transceiver unit 1301 of the terminal 130. For example, the transceiver unit 1301 is configured to support the terminal in performing the receiving function and the sending function described in FIG. 2 or FIG. 6. The processor that has a processing function is considered as a processing unit 1302 of the terminal 130. As shown in FIG. 13, the terminal 130 includes the transceiver unit 1301 and the processing unit 1302. The transceiver unit may also be referred to as a transceiver, a transceiver, a transceiver apparatus, or the like. In one embodiment, a component that is in the transceiver unit 1301 and that is configured to implement a receiving function may be considered as a receiving unit, and a component that is in the transceiver unit 1301 and that is configured to implement a sending function may be considered as a sending unit. In other words, the transceiver unit 1301 includes the receiving unit and the sending unit. The receiving unit may also be referred to as a receiver, an input port, a receiver circuit, or the like, and the sending unit may be referred to as a transmitter, a transmitter, a transmitter circuit, or the like.

The processor 1302 may be configured to execute an instruction stored in the memory, to control the transceiver unit 1301 to receive and/or send a signal, thereby completing the function of the terminal in the foregoing method embodiment. In an implementation, it may be considered to implement a function of the transceiver unit 1301 by using a transceiver circuit or a dedicated transceiver chip.

Figure 14:
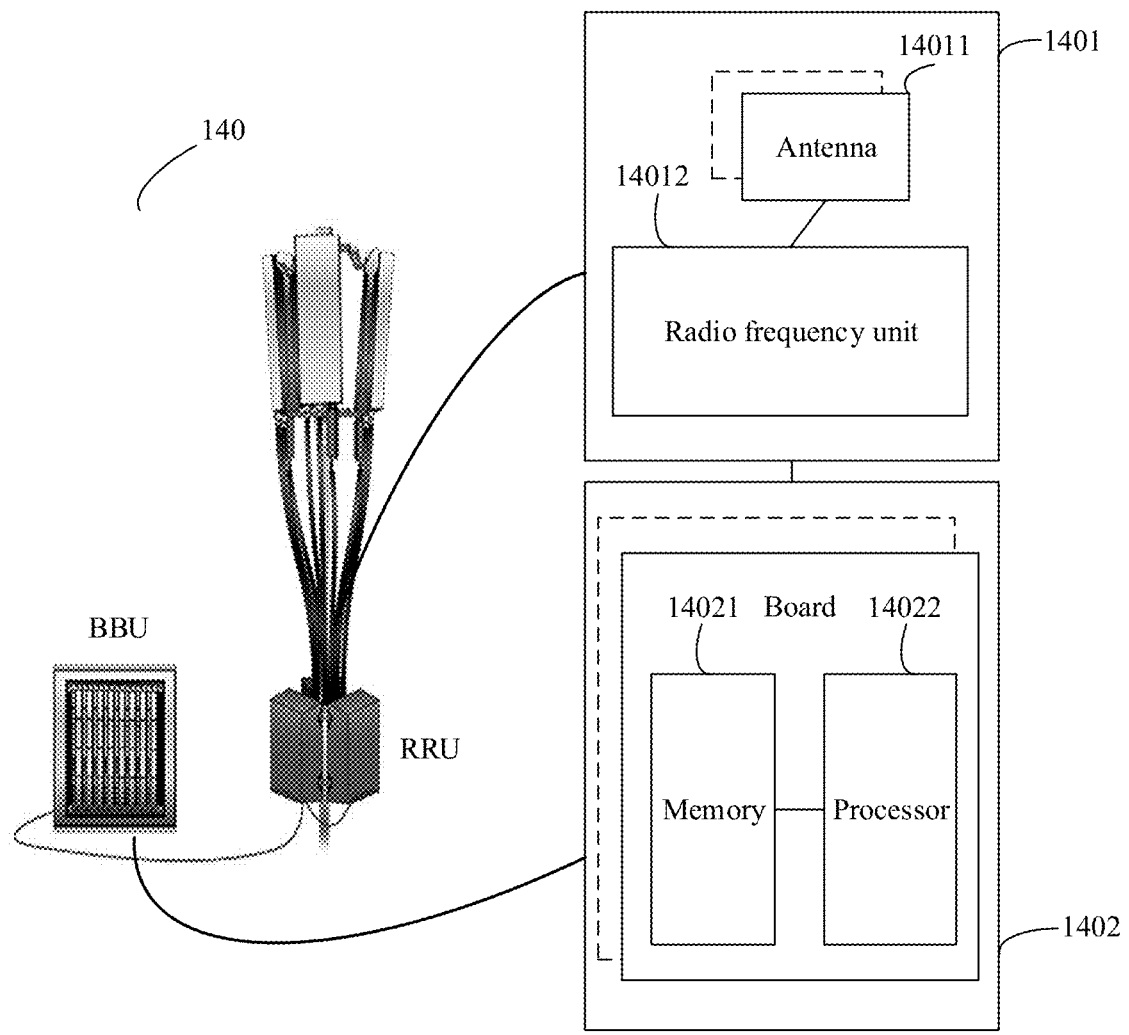
FIG. 14 is a schematic structural diagram of an access network device according to an embodiment of this application.

FIG. 14 is a schematic structural diagram of an access network device according to an embodiment of this application, for example, may be a schematic structural diagram of a base station. As shown in FIG. 14, the base station may be applied to the procedure shown in FIG. 2 or FIG. 6, and implements a function of the access network device in the foregoing method embodiment. The base station 140 may include one or more radio frequency units such as a remote radio unit (remote radio unit, RRU) 1401 and one or more baseband units (baseband unit, BBU) (which may also be referred to as digital units (digital unit, DU)) 1402. The RRU 1401 may be referred to as a transceiver unit, a transceiver, a transceiver circuit, a transceiver, or the like. The RRU 1401 may include at least one antenna 14011 and a radio frequency unit 14012. The RRU 1401 part is mainly configured to receive and send a radio frequency signal and perform conversion between a radio frequency signal and a baseband signal, for example, configured to send the signaling message in the foregoing embodiments to a terminal. The BBU 1402 part is mainly configured to: perform baseband processing, control the base station, and the like. The RRU 1401 and the BBU 1402 may be physically disposed together, or may be physically disposed separately, to be specific, may be on a distributed base station.

The BBU 1402 is a control center of the base station, may also be referred to as a processing unit, and is mainly configured to implement a baseband processing function such as channel coding, multiplexing, modulation, or spreading. For example, the BBU (the processing unit) 1402 may be configured to control the base station to perform operation procedures related to the access network device in the foregoing method embodiments.

In an example, the BBU 1402 may include one or more boards, and a plurality of boards may jointly support a radio access network (for example, an LTE network) of a single access standard, or may separately support radio access networks (such as an LTE network, a 5G network, or another network) of different access standards. The BBU 1402 further includes a memory 14021 and a processor 14022. The memory 14021 is configured to store necessary instructions and data. For example, the memory 14021 stores a correspondence between a codebook index and a precoding matrix in the foregoing embodiment. The processor 14022 is configured to control the base station to perform a necessary action. For example, the processor 14022 is configured to control the base station to perform the operation procedure related to the access network device in the foregoing method embodiment. The memory 14021 and the processor 14022 may serve one or more boards. In other words, a memory and a processor may be separately disposed on each board. Alternatively, a plurality of boards may share a same memory and a same processor. In addition, a necessary circuit may be further disposed on each board.

Figure 15:
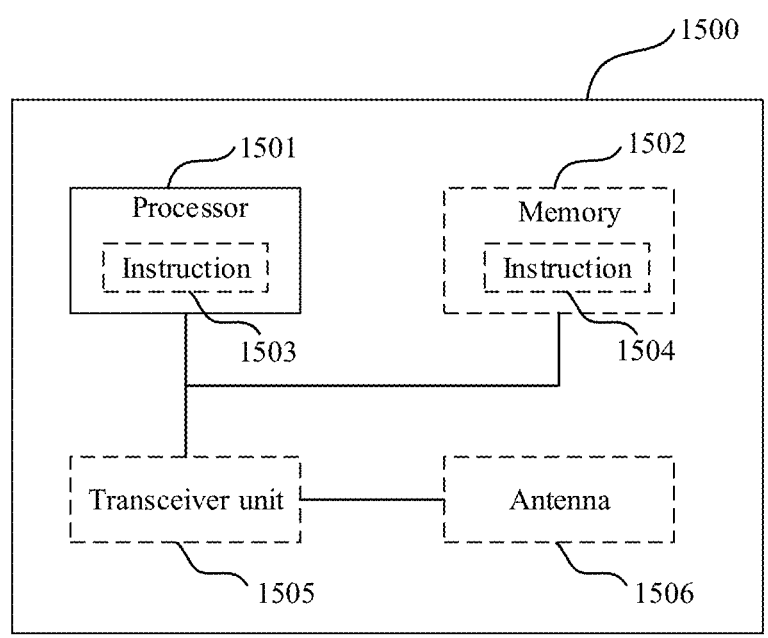
FIG. 15 is a schematic structural diagram of a communications apparatus according to an embodiment of this application.

FIG. 15 is a schematic structural diagram of a communications apparatus 1500. The apparatus 1500 may be configured to implement the method described in the foregoing method embodiments. For details, refer to the descriptions in the foregoing method embodiment. The communications apparatus 1500 may be a chip, an access network device (for example, a base station), a terminal, another access network device, or the like.

The communications apparatus 1500 includes one or more processors 1501. The processor 1501 may be a general-purpose processor and/or a dedicated processor, or the like. For example, the processor 1501 may be a baseband processor or a central processing unit. The baseband processor may be configured to process a communication protocol and communications data. The central processing unit may be configured to: control the communications apparatus (such as a base station, a terminal, or a chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used by a terminal, a base station, or another access network device. For another example, the communications apparatus may be a terminal, a base station, or another access network device, and the transceiver unit may be a transceiver, a radio frequency chip, or the like.

The communications apparatus 1500 includes one or more processors 1501. The one or more processors 1501 may implement the method performed by the access network device or the terminal in the embodiment shown in FIG. 2 or FIG. 6.

In one embodiment, the communications apparatus 1500 includes a means (means) configured to generate resource configuration information and a means (means) configured to send the resource configuration information. One or more processors may be used to implement functions of the means for generating the resource configuration information and the means for sending the resource configuration information. For example, the resource configuration information may be generated by using one or more processors, and sent by using the transceiver, the input/output circuit, or the interface of the chip. For the resource configuration information, refer to the related descriptions in the foregoing method embodiments.

In one embodiment, the communications apparatus 1500 includes a means configured to receive resource configuration information and a means configured to determine a resource indicated by the resource configuration information. For the resource configuration information and how to determine the resource indicated by the resource configuration information, refer to the related descriptions in the foregoing method embodiments. For example, the resource configuration information may be received by using the transceiver, the input/output circuit, or the interface of the chip, and a resource indicated by the resource configuration information is determined by using one or more processors.

In one embodiment, the processor 1501 may further implement another function in addition to the method in the embodiment shown in FIG. 2 or FIG. 6.

In one embodiment, in a design, the processor 1501 may further include an instruction 1503. The instruction may be run on the processor, so that the communications apparatus 1500 performs the methods described in the foregoing method embodiments.

In one embodiment, the communications apparatus 1500 may alternatively include a circuit. The circuit may implement the function of the access network device or the terminal in the foregoing method embodiments.

In one embodiment, the communications apparatus 1500 may include one or more memories 1502. The one or more memories 1502 store an instruction 1504. The instruction may be run on the processor, so that the communications apparatus 1500 performs the methods described in the foregoing method embodiments. In one embodiment, the memory may further store data. In one embodiment, the processor may also store an instruction and/or data. For example, the one or more memories 1502 may store the correspondence described in the foregoing embodiments, or the related parameter, the related table, or the like in the foregoing embodiments. The processor and the memory may be disposed separately, or may be integrated together.

In one embodiment, the communications apparatus 1500 may further include a transceiver unit 1505 and an antenna 1506. The processor 1501 may be referred to as a processing unit, and controls the communications apparatus (a terminal or a base station). The transceiver unit 1505 may be referred to as a transceiver, a transceiver circuit, a transceiver, or the like, and is configured to implement a transceiver function of the communications apparatus by using the antenna 1506.

This application further provides a communications system. The communications system includes the foregoing one or more access network devices and the foregoing one or more terminals.

An embodiment of this application further provides a computer readable medium. The computer readable medium stores a computer program. When the computer program is executed by a computer, the method in any method embodiment is implemented.

An embodiment of this application further provides a computer program product. When the computer program product is executed by a computer, the method in any method embodiment is implemented.

It should be understood that, the processor in the embodiments of this application may be a central processing unit (CPU), and the processor may further be another general-purpose processor, a digital signal processor (DSP), an application-specific integrated circuit (ASIC), a field programmable gate array (FPGA) or another programmable logical device, a discrete gate or transistor logical device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and the volatile memory is used as an external cache. In an example but not a limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

All or some of the foregoing embodiments may be implemented by using software, hardware (for example, a circuit), firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or an access network device) to perform all or some of the operations of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
   determining resource configuration information, wherein the resource configuration information indicates a resource to transmit control information, and wherein a resource indication uses a unit of a resource block group (RBG), wherein the resource configuration information comprises a frequency domain resource identifier that indicates a frequency domain resource in which the resource is located and an RBG bitmap that indicates a location of the RBG in the frequency domain resource indicated by the frequency domain resource identifier; and
   sending the resource configuration information to a terminal.

2. The method according to claim 1, wherein the resource configuration information comprises one or more of the following:
   RBG capacity information, wherein the RBG capacity information indicates a quantity of RBs comprised in one RBG;
   a format of the control information corresponding to the resource indicated by the resource configuration information; or
   a payload type of the resource indicated by the resource configuration information, wherein the payload type of the resource indicated by the resource configuration information is classified based on a payload size of the control information corresponding to the resource indicated by the resource configuration information.

3. The method according to claim 1, wherein the RBG bitmap comprises L bits, where L is an integer greater than or equal to 1,
   wherein the L bits in the RBG bitmap correspond to one or more resource block groups (RBGs) in the frequency domain resource; and
   wherein a first value of the L bits indicates that the RBG is in the frequency domain resource indicated by the frequency domain resource identifier, and a second value of the L bits indicates that the RBG is not in the frequency domain resource indicated by the frequency domain resource identifier.

4. The method according to claim 1, wherein a quantity of resource blocks (RBs) comprised in the RBG is preset; or
   wherein the quantity of RBs comprised in the RBG is determined based on a correspondence between the quantity of RBs and one or more of a format of the control information corresponding to the resource, a payload type of the resource, a payload size of the control information corresponding to the resource, or a bandwidth of a frequency domain resource corresponding to a frequency domain resource identifier.

5. The method according to claim 1, wherein the resource configuration information comprises one or more of the following:
   a quantity of RBs comprised in the resource indicated by the resource configuration information; or
   a pattern identifier, wherein a pattern indicated by the pattern identifier is a pattern of the resource indicated by the resource configuration information.

6. The method according to claim 5, wherein when the resource configuration information comprises the pattern identifier, the quantity of RBs comprised in the resource indicated by the resource configuration information is a quantity of RBs corresponding to the pattern identifier.

7. The method according to claim 5, wherein when the resource configuration information comprises the quantity of RBs comprised in the resource indicated by the resource configuration information, the pattern of the resource indicated by the resource configuration information is a pattern corresponding to the quantity of RBs comprised in the resource indicated by the resource configuration information.

8. The method according to claim 5, wherein the quantity of RBs comprised in the resource indicated by the resource configuration information corresponds to at least one pattern;
   wherein there is no same pattern identifier in pattern identifiers of patterns corresponding to different quantities of RBs, and each pattern is in a unique correspondence with a pattern identifier; or
   wherein there is a same pattern identifier in pattern identifiers of patterns corresponding to different quantities of RBs, and each pattern is in a correspondence with a pattern identifier and a quantity of RBs.

9. The method according to claim 6, wherein the quantity of RBs comprised in the resource indicated by the resource configuration information is determined based on one or more of the following:
   a payload size of the control information corresponding to the resource indicated by the resource configuration information;
   a payload type of the control information corresponding to the resource indicated by the resource configuration information, wherein the PUCCH payload type is classified based on a payload size of uplink control information in a PUCCH resource; or
   a PUCCH format.

10. The method according to claim 6, wherein the pattern of the resource indicated by the resource configuration information is determined based on one or more of the following:
   the payload size of the control information corresponding to the resource indicated by the resource configuration information;
   the payload type of the control information corresponding to the resource indicated by the resource configuration information; or
   a format of the control information corresponding to the resource indicated by the resource configuration information.

11. The method according to claim 1, wherein the resource configuration information comprises one or more of the following:
   a resource allocation type;
   a resource allocation type parameter corresponding to the resource allocation type;
   a quantity of RBs comprised in the resource indicated by the resource configuration information; or
   a pattern identifier, wherein a pattern indicated by the pattern identifier is a pattern of the resource indicated by the resource configuration information.

12. The method according to claim 11, wherein the resource allocation type comprises one or a combination of the following types:
   a first type, using an RBG bitmap to indicate a location, in a frequency domain resource, of an RBG comprised in the resource indicated by the resource configuration information;
   a second type, indicating a start RB of the resource indicated by the resource configuration information and a quantity of RBs comprised in the resource indicated by the resource configuration information;
   a third type, indicating the quantity of RBs comprised in the resource indicated by the resource configuration information and/or a pattern of a PUCCH resource indicated by the resource configuration information;
   a fourth type: a resource allocation type 0;
   a fifth type: a resource allocation type 1; or
   a sixth type: a resource allocation type 2.

13. The method according to claim 11, wherein when the resource configuration information does not comprise the resource allocation type, wherein the resource allocation type is a predefined resource allocation type, or wherein the resource allocation type is the same as a resource allocation type of data scheduling.

14. A communication method comprising:
   receiving resource configuration information from an access network device, wherein the resource configuration information indicates a resource to transmit control information, and wherein a resource indication uses a unit of a resource block group (RBG), wherein the resource configuration information comprises a frequency domain resource identifier that indicates a frequency domain resource in which the resource is located and an RBG bitmap that indicates a location of the RBG in the frequency domain resource indicated by the frequency domain resource identifier; and
   transmitting the control information by using the resource indicated by the resource configuration information.

15. The method according to claim 14, wherein the resource configuration information comprises one or more of the following:
   RBG capacity information, wherein the RBG capacity information indicates a quantity of RBs comprised in one RBG;
   a format of the control information corresponding to the resource indicated by the resource configuration information; or
   a payload type of the resource indicated by the resource configuration information, wherein the payload type of the resource indicated by the resource configuration information is classified based on a payload size of the control information corresponding to the resource indicated by the resource configuration information.

16. The method according to claim 14, wherein the resource configuration information comprises one or more of the following:
   a quantity of RBs comprised in the resource indicated by the resource configuration information; or
   a pattern identifier, wherein a pattern indicated by the pattern identifier is a pattern of the resource indicated by the resource configuration information.

17. The method according to claim 16, wherein when the resource configuration information comprises the pattern identifier, the quantity of RBs comprised in the resource indicated by the resource configuration information is a quantity of RBs corresponding to the pattern identifier.

18. The method according to claim 16, wherein when the resource configuration information comprises the quantity of RBs comprised in the resource indicated by the resource configuration information, the pattern of the resource indicated by the resource configuration information is a pattern corresponding to the quantity of RBs comprised in the resource indicated by the resource configuration information.

19. The method according to claim 16, wherein the quantity of RBs comprised in the resource indicated by the resource configuration information corresponds to at least one pattern;
   wherein there is no same pattern identifier in pattern identifiers of patterns corresponding to different quantities of RBs, and each pattern is in a unique correspondence with a pattern identifier; or
   wherein there is a same pattern identifier in pattern identifiers of patterns corresponding to different quantities of RBs, and each pattern is in a correspondence with a pattern identifier and a quantity of RBs.

20. A communications apparatus, comprising at least one processor, wherein the at least one processor is coupled to at least one memory; and
   the at least one processor is configured to execute a computer program or an instruction stored in the at least one memory, so that the apparatus performs operations, the operations including:
      determining resource configuration information, wherein the resource configuration information indicates a resource to transmit control information, and wherein a resource indication uses a unit of a resource block group (RBG), wherein the resource configuration information comprises a frequency domain resource identifier that indicates a frequency domain resource in which the resource is located and an RBG bitmap that indicates a location of the RBG in the frequency domain resource indicated by the frequency domain resource identifier; and
      sending the resource configuration information to a terminal.

* * * * *